(12) United States Patent
Sandou et al.

(10) Patent No.: US 11,643,960 B2
(45) Date of Patent: *May 9, 2023

(54) ENGINE DEVICE

(71) Applicant: Yanmar Power Technology Co., Ltd., Osaka (JP)

(72) Inventors: Yoshiyuki Sandou, Osaka (JP); Hiroaki Naganawa, Osaka (JP); Kazuma Sugimoto, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,107

(22) Filed: Jul. 14, 2021

(65) Prior Publication Data

US 2021/0340897 A1    Nov. 4, 2021

Related U.S. Application Data

(63) Continuation of application No. 16/901,122, filed on Jun. 15, 2020, now Pat. No. 11,092,056, which is a (Continued)

(30) Foreign Application Priority Data

Feb. 19, 2016 (JP) ................................ 2016-030016
Feb. 19, 2016 (JP) ................................ 2016-030017

(51) Int. Cl.
*F01N 3/28* (2006.01)
*F01N 13/00* (2010.01)
(Continued)

(52) U.S. Cl.
CPC ........... *F01N 3/2882* (2013.01); *F01N 3/021* (2013.01); *F01N 3/023* (2013.01); *F01N 3/035* (2013.01);
(Continued)

(58) Field of Classification Search
CPC ...... F01N 3/2882; F01N 3/035; F01N 3/2892; F01N 3/2066; F01N 3/021; F01N 3/023;
(Continued)

(56) References Cited

U.S. PATENT DOCUMENTS 8,985,262 B2 * 3/2015 Sekiya ................... B60K 13/04
                                                   180/89.2
9,416,707 B2 * 8/2016 Tanaka .................. F01N 3/2066
(Continued)

FOREIGN PATENT DOCUMENTS

EP          2980381 A1 *   2/2016   ............ B60K 13/04

*Primary Examiner* — Brandon D Lee
(74) *Attorney, Agent, or Firm* — Chris Mizumoto

(57) ABSTRACT

An exhaust gas purification device including: a first case communicating with an exhaust manifold of an engine and internally including a first exhaust gas purification body for removing a carbon compound; and a second case communicating with an exhaust outlet of the first case and internally including second exhaust gas purification bodies for removing a nitrogen compound. The first case and the second case are arranged above the engine and in an L-shape to respectively extend along two side surfaces of the engine, the two side surfaces being adjacent to each other.

4 Claims, 19 Drawing Sheets

Related U.S. Application Data continuation of application No. 15/999,653, filed as application No. PCT/JP2017/005597 on Feb. 15, 2017, now Pat. No. 10,690,034.

(51) Int. Cl.
  *F01N 3/035* (2006.01)
  *F01N 3/20* (2006.01)
  *F01N 3/021* (2006.01)
  *F01N 3/023* (2006.01)

(52) U.S. Cl.
  CPC ......... *F01N 3/2066* (2013.01); *F01N 3/2892* (2013.01); *F01N 13/009* (2014.06); *F01N 2240/20* (2013.01); *F01N 2470/02* (2013.01); *F01N 2590/08* (2013.01); *F01N 2610/02* (2013.01)

(58) Field of Classification Search
  CPC ............... F01N 13/009; F01N 2240/20; F01N 2470/02; F01N 2590/08; F01N 2610/02; F01N 3/022; F01N 3/2821; F01N 2610/1453; Y02T 10/12
  USPC .......................................................... 60/302
  See application file for complete search history.

(56) References Cited

U.S. PATENT DOCUMENTS

| | | | | |
|---|---|---|---|---|
| 10,690,034 | B2* | 6/2020 | Sandou | F01N 13/009 |
| 11,092,056 | B2* | 8/2021 | Sandou | F01N 3/021 |
| 2007/0193252 | A1* | 8/2007 | McKinley | F01N 3/2066 60/286 |
| 2008/0216470 | A1* | 9/2008 | Sedlacek | F01N 13/08 60/324 |
| 2010/0107612 | A1* | 5/2010 | Yamazaki | F01N 3/106 60/303 |
| 2013/0343853 | A1* | 12/2013 | Sato | E02F 9/0866 414/719 |
| 2014/0262590 | A1* | 9/2014 | Daborn | B60K 13/04 60/299 |
| 2014/0311132 | A1* | 10/2014 | Arai | E02F 3/764 60/286 |
| 2016/0010525 | A1* | 1/2016 | Sandou | F01N 3/106 60/301 |
| 2016/0040568 | A1* | 2/2016 | Sandou | B60K 5/12 180/309 |
| 2016/0115671 | A1* | 4/2016 | Sakai | E02F 9/0866 172/292 |
| 2017/0051472 | A1* | 2/2017 | Mochimaru | F01N 13/009 |

\* cited by examiner

ENGINE DEVICE

CROSS REFERENCES TO RELATED APPLICATIONS

This application is a continuation of U.S. application Ser. No. 16/901,122 filed Jun. 15, 2020, which is a continuation of U.S. application Ser. No. 15/999,653 filed Aug. 20, 2018, which is a national stage application pursuant to 35 U.S.C. § 371 of International Application No. PCT/JP2017/005597, filed on Feb. 15, 2017, which claims priority under 35 U.S.C. § 119 to Japanese Patent Application Nos. 2016-030016 and 2016-030017, both filed on Feb. 19, 2016, the disclosures of which are hereby incorporated by reference in their entireties.

DESCRIPTION

Technical Field

The present invention relates to an engine device, such as a diesel engine, to be mounted in, e.g., an agricultural machine (a tractor, a combine harvester) or a construction machine (a bulldozer, a hydraulic excavator, a loader), and specifically to an engine device equipped with an exhaust gas purification device for removing, e.g., a particulate matter (soot, particulates) contained in the exhaust gas or a nitrogen oxide (NOx) contained in the exhaust gas.

Background Art

Traditionally, there have been known techniques for purifying an exhaust gas from a diesel engine by introducing the exhaust gas into an exhaust gas purification device (an exhaust gas aftertreatment device) disposed in an exhaust gas path of the diesel engine, the exhaust gas purification device being constituted by a case internally including a diesel particulate filter (hereinafter, such a case will be referred to as a DPF case) and a case internally including a urea selective reduction catalyst (hereinafter, such a case will be referred to as a selective catalytic reduction (SCR) case) (see, e.g., Patent Literatures 1 and 2 (hereinafter, referred to as PTLs 1 and 2)).

CITATION LIST

PTL 1: Japanese Patent No. 5543563
PTL 2: Japanese Patent No. 5244334

In a configuration as those in PTL 1 in which an exhaust gas purification device constituted by a DPF case and an SCR case disposed in parallel is attached to an engine, an area required for mounting the exhaust gas purification device on the engine device is large. This leads to upsizing of the engine device, which is disadvantageous. In addition, in a configuration in which the above-described exhaust gas purification device is mounted above the engine device, a height of the engine device increases by a height of the exhaust gas purification device.

PTL 2 discloses a configuration including a DPF case, a connecting pipe having an inserted portion which is inserted into the DPF case and on which a plurality of through-holes is provided, and a urea water injection nozzle disposed at an end of the connecting pipe, wherein urea water and an exhaust gas are mixed together. In this configuration, the connecting pipe needs to have an adequate length. Otherwise, the urea and the exhaust gas are not mixed adequately, which leads to a reduction in purification effect and to upsizing of the exhaust gas purification device, disadvantageously.

Some aspects of the present invention have an object to provide an engine device that has been improved as a result of study of the circumstances described above.

SUMMARY OF INVENTION

In order to attain the above object, an engine device according to an aspect of the present invention is an engine device including an exhaust gas purification device including a first case communicating with an exhaust manifold of an engine and internally including a first exhaust gas purification body for removing a carbon compound and a second case communicating with an exhaust outlet of the first case and internally including a second exhaust gas purification body for removing a nitrogen compound, wherein the first and second cases are arranged above the engine in an L-shape to respectively extend along two side surfaces of the engine, the two side surfaces being adjacent to each other.

The engine device described above may be configured such that a turbocharger is interposed between the first case and the exhaust manifold, and the first case and the turbocharger are connected to each other in series above the exhaust manifold disposed close to, among the two side surfaces of the engine, a first side surface.

The engine device described above may be configured such that a flywheel housing is disposed close to, among the two side surfaces of the engine, a second side surface intersecting the first side surface, and the second case is disposed above the flywheel housing.

The engine device described above may be configured such that the second case is disposed below the first case, and the first case and the second case are connected to each other via a urea mixing tube in a position in which the first case and the second case overlap each other in a plan view.

The engine device described above may be configured such that a urea-water injection body for injecting urea water into the first case is fixed to a portion of an outer peripheral surface of the first case, the portion being in the position in which the first case and the second case overlap each other in a plan view, the portion being not a portion of the first case through which the urea mixing tube is inserted into the first case. The engine device described above may be configured such that a part of the second exhaust gas purification body is a selective catalytic reduction filter made of a particulate-matter collection filter to which a catalytic component for urea selective catalytic reduction is applied.

The engine device described above may be configured such that a urea-water injection body for injecting urea water into a urea mixing tube is disposed in a portion of the first case that is close to the exhaust outlet of the first case, and the urea mixing tube has both ends respectively inserted into the exhaust outlet of the first case and an exhaust inlet of the second case to allow the first case and the second case to communicate with each other.

The engine device described above may be configured such that the urea mixing tube has a first inserted portion that is inserted into the first case, the first inserted portion extending toward the urea-water injection body, the first inserted portion having a tube wall on which an exhaust introduction opening is bored, the exhaust introduction opening allowing an exhaust gas having passed through the first exhaust gas purification body to be introduced into the urea mixing tube.

The engine device described above may be configured such that the urea mixing tube has a second inserted portion that is inserted into the second case, the second inserted portion having a distal end that is tapered, the second inserted portion extending to a position apart from an inner wall surface of the second case.

The engine device described above may be configured such that a mixer for stirring and mixing urea water with an exhaust gas is internally included in a second inserted portion of the urea mixing tube, the second inserted portion being inserted into the second case.

The engine device described above may be configured such that a mixer for stirring and mixing urea water with an exhaust gas is disposed in the first inserted portion of the urea mixing tube, the first inserted portion being inserted into the first case.

The engine device described above may be configured such that the second case is disposed below the first case, and the first case and the second case are connected to each other via the urea mixing tube in a position in which the first case and the second case overlap each other in a plan view.

According to the aspect of the present invention, the first and second cases are arranged in an L-shape above the engine. Thus, the first and second cases can be arranged dispersedly in a space above the engine. Consequently, the top surface side of the engine device can be made low. Thus, upsizing of the engine device including the exhaust gas purification device can be suppressed or reduced, and the engine device having a compact size can be mounted in a limited space of an engine room of, e.g., a work machine.

According to the aspect of the present invention, the turbocharger and the first case can be compactly disposed above the exhaust manifold. Consequently, the top surface side of the engine device can be made low. In addition, a passage from an outlet of the exhaust manifold to the first case can be made shorter. Furthermore, the turbocharger and the first case can be rigidly supported at a side surface of the engine via the exhaust manifold.

According to the aspect of the present invention, the second case is disposed above the flywheel housing. Consequently, the second case can also be disposed compactly in the space above the flywheel housing. Thus, upsizing of the engine device including the exhaust gas purification device can be suppressed or reduced.

According to the aspect of the present invention, the second case is disposed below the first case, and the first case and the second case are connected to each other via the urea mixing tube in the position in which the first case and the second case overlap each other in a plan view. Consequently, the connected portion between the first case and the second case can be made shorter. This makes it possible to suppress or reduce the phenomenon that an exhaust gas passing through the urea mixing tube is influenced by a temperature of outside air, thereby making it possible to reduce the phenomenon that a crystal lump of a urea component is formed in the exhaust gas purification device. Consequently, it is possible to easily prevent an increase in exhaust resistance in the exhaust gas purification device that may otherwise be caused by, e.g., growth of the urea crystal lump.

According to the aspect of the present invention, the urea-water injection body is mounted in the first case, so that the urea-water injection body and the first case can be constituted as a single unit. This makes it easier to perform an assembling work for mounting the exhaust gas purification device onto the engine device.

According to the aspect of the present invention, the second case is provided with the SCR filter. Thus, the collecting filter can be omitted from the first case. Accordingly, the first case can be downsized. Consequently, the engine device including the exhaust gas purification device can be made compact.

According to the aspect of the present invention, the urea-water injection body is mounted in the first case, so that the urea-water injection body and the first case can be constituted as a single unit. This makes it easier to perform an assembling work for mounting the exhaust gas purification device onto the engine device. In addition, according to the aspect of the present invention, both the ends of the urea mixing tube are respectively inserted into the first and second cases. Consequently, the inside of the urea mixing tube can be maintained at a high temperature by a temperature atmosphere of the exhaust gas. This makes it possible to suppress or reduce crystallization of a urea component in urea water having been injected into the urea mixing tube.

According to the aspect of the present invention, the exhaust introduction opening is provided on the tube wall of the urea mixing tube. Consequently, a flow velocity of an exhaust gas flowing through the urea mixing tube can be made uniform, and thus urea water sprayed from the urea-water injection body toward the inside of the urea mixing tube is more likely to be stirred and dispersed. This improves the evaporativity of the urea component at a low temperature, and also enhances the reaction efficiency between the exhaust gas and the urea component.

According to the aspect of the present invention, the outlet-side end of the urea mixing tube has a squeezed shape. Consequently, urea water is caused to collide with an inner wall surface of the outlet-side end of the urea mixing tube. This allows evaporation of an unreacted urea component, thereby making it possible to facilitate a reaction between the exhaust gas and the urea component in the second case. In addition, due to the configuration in which the outlet-side end of the urea mixing tube is apart from the second case, it is possible to prevent the urea component from reaching an inner wall surface of the second case, thereby making it possible to suppress or reduce the phenomenon that a crystal lump is formed on the inner wall surface of the second case.

According to the aspect of the present invention, the mixer internally included in the urea mixing tube is positioned in the first case or the second case. This makes it possible to suppress or reduce a temperature drop in the mixer. In addition, since the exhaust gas whose flow velocity has been made uniform in the urea mixing tube flows into the mixer, a rotation performance of the mixer is made uniform. This facilitates mixing of the urea water with the exhaust gas, thereby making it possible to enhance the evaporativity of the urea component. Thus, it is possible to prevent crystallization of the urea component at the mixer. Not only this, it is also possible to facilitate a reaction between the exhaust gas and the urea component, and to suppress or reduce the phenomenon that the urea water in the form of droplets enters the second case.

According to the aspect of the present invention, the second case is disposed below the first case, and the first case and the second case are connected to each other via the urea mixing tube in the position in which the first case and the second case overlap each other in a plan view. Consequently, the connected portion between the first case and the second case can be made shorter. This makes it possible to suppress or reduce the phenomenon that an exhaust gas passing through the urea mixing tube is influenced by a temperature of outside air, thereby making it possible to reduce the phenomenon that a crystal lump of a urea component is formed in the exhaust gas purification device. Consequently, it is possible to easily prevent an increase in exhaust resistance in the exhaust gas purification device that may otherwise be caused by, e.g., growth of the urea crystal lump.

DESCRIPTION OF EMBODIMENTS

Figure 1:
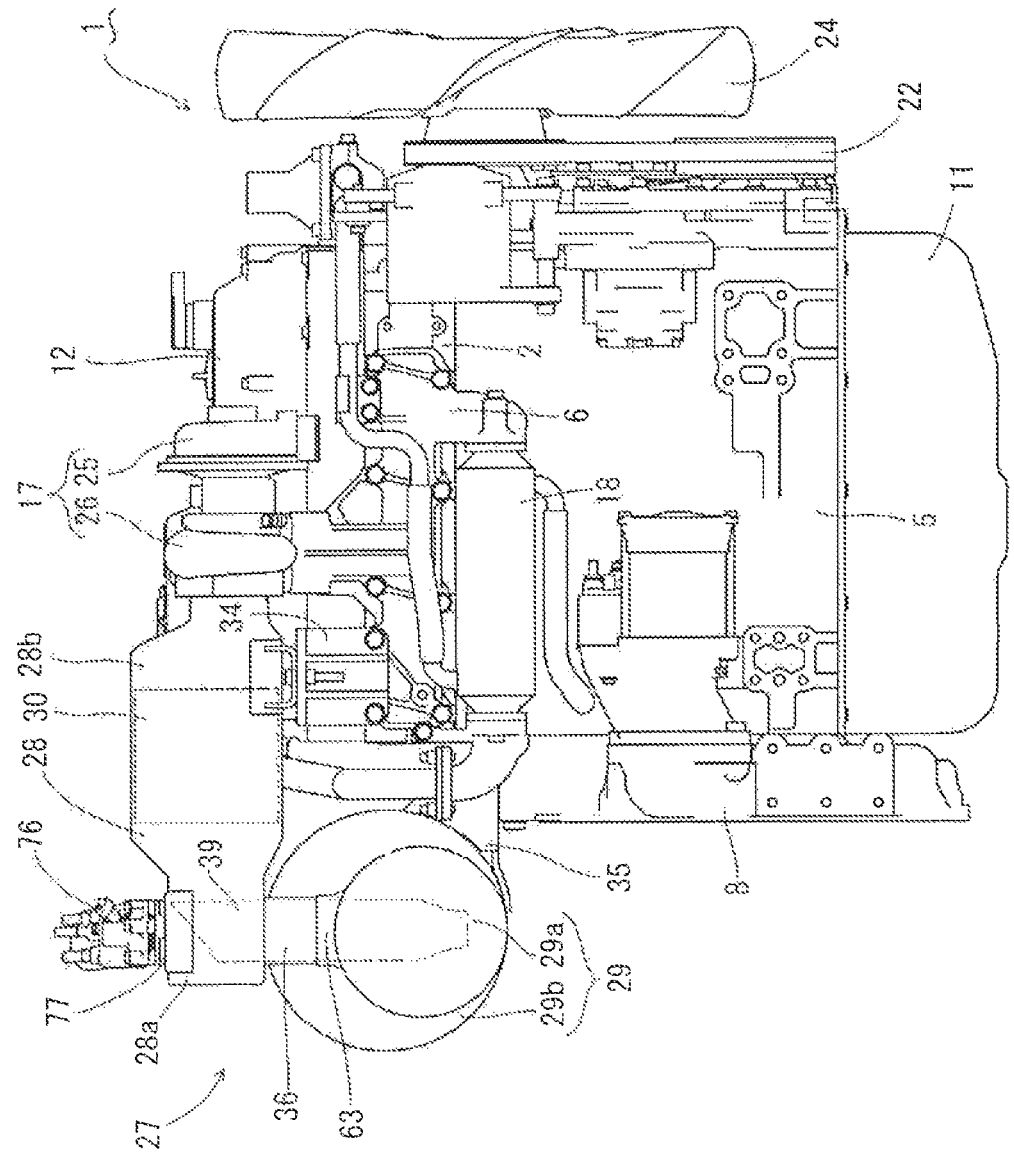
FIG. 1 illustrates a right side view of a diesel engine according to a first embodiment.
Figure 2:
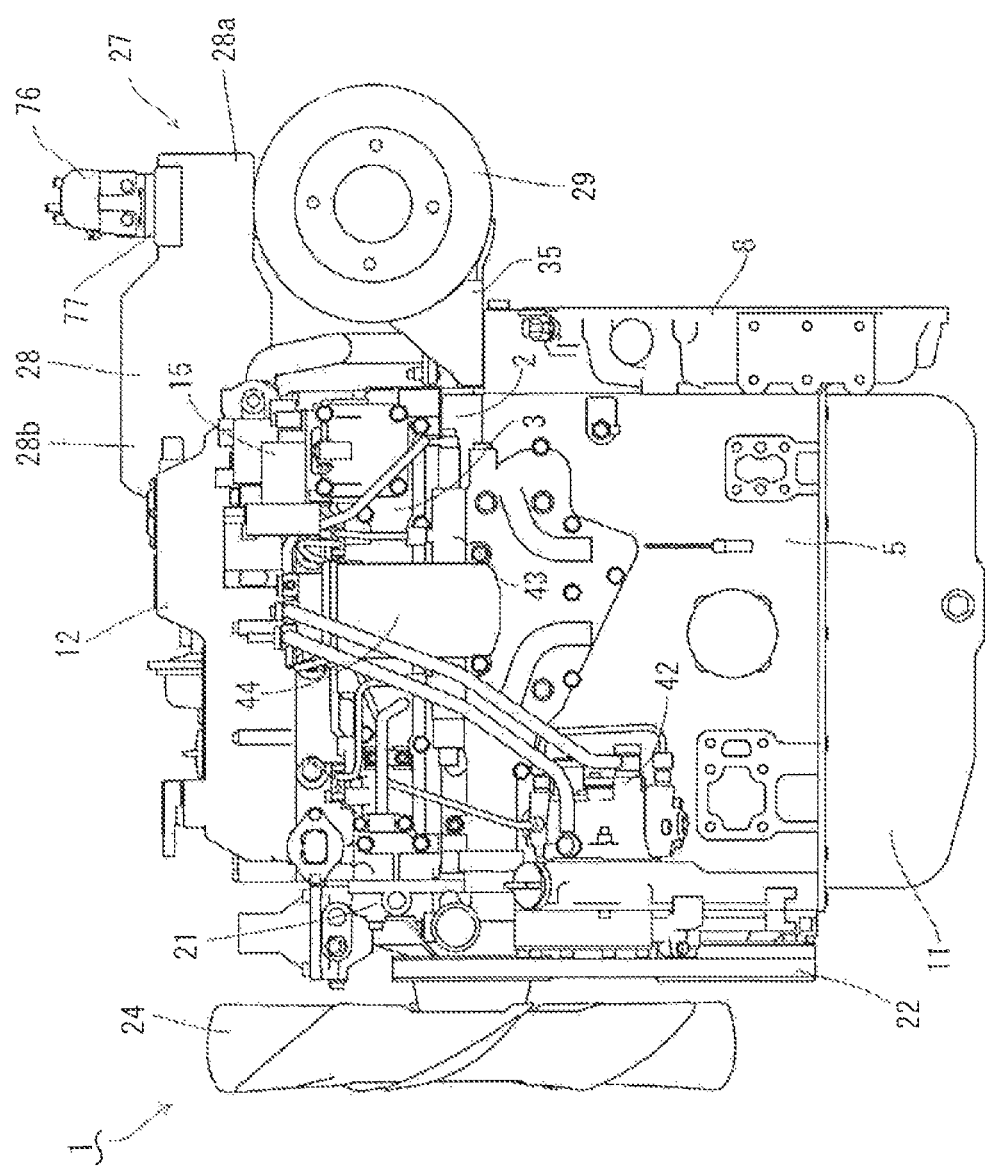
FIG. 2 illustrates a left side view of the diesel engine according to the first embodiment.
Figure 3:
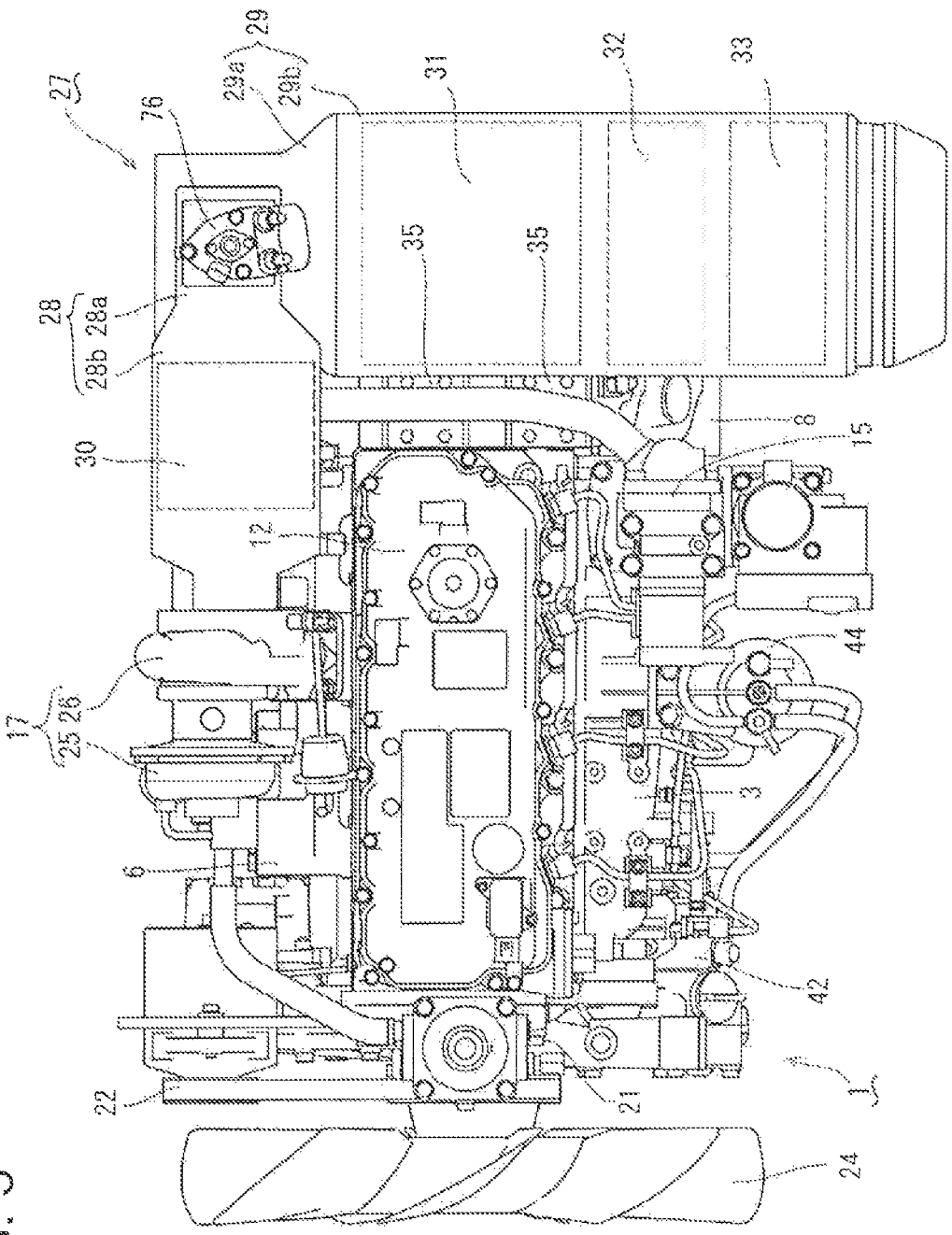
FIG. 3 illustrates a plan view of the diesel engine according to the first embodiment.
Figure 4:
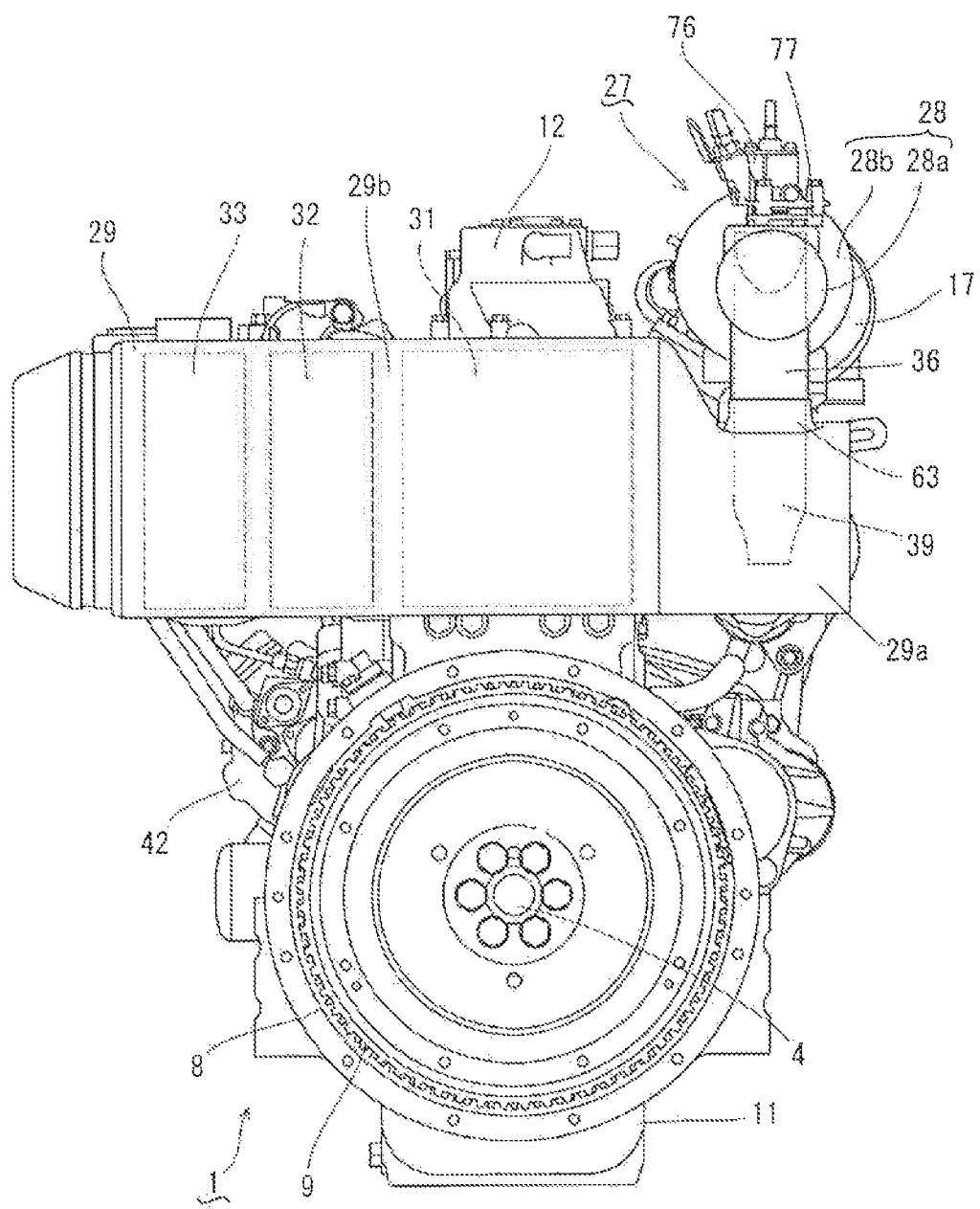
FIG. 4 illustrates a back view of the diesel engine according to the first embodiment.

With reference to the drawings (FIGS. 1 to 6), the following will describe a first embodiment in which the present invention is implemented. FIG. 1 is a right side view of a diesel engine 1, showing a right side on which an exhaust manifold 6 is disposed. FIG. 2 is a left side view of the diesel engine 1, showing a left side on which an intake manifold 3 is disposed. FIG. 3 is a plan view of the diesel engine 1, showing a side on which a cylinder head cover 12 is disposed. FIG. 4 is a back view of the diesel engine 1, showing a side on which a flywheel housing 8 is disposed. The side of the diesel engine 1 on which the exhaust manifold 6 is disposed is referred to as a right side of the diesel engine 1. The side of the diesel engine 1 on which the intake manifold 3 is disposed is referred to as a left side of the diesel engine 1. The side of the diesel engine 1 on which a cooling fan 24 is disposed is referred to as a front side of the diesel engine 1.

Next, with reference to FIGS. 1 to 4, a configuration of the whole of the diesel engine 1 will be described. The diesel engine 1 includes a cylinder head 2 having one side surface on which the intake manifold 3 is disposed. The cylinder head 2 is mounted above a cylinder block 5 including an engine output shaft 4 (crankshaft) and pistons (not illustrated). The cylinder head 2 has another side surface on which the exhaust manifold 6 is disposed. Front and rear ends of the engine output shaft 4 respectively protrude from front and back side surfaces of the cylinder block 5.

The cylinder block 5 has a back surface to which the flywheel housing 8 is fixedly attached. In the flywheel housing 8, a flywheel 9 is disposed. The flywheel 9 is pivotally supported at a rear end of the engine output shaft 4. A driving force of the diesel engine 1 is taken via the flywheel 9. The cylinder block 5 has a lower surface on which an oil pan 11 is disposed. The cylinder head cover 12 is disposed adjacent to an upper surface of the cylinder head 2.

The intake manifold 3 is provided with an exhaust gas recirculation (EGR) device 15 for taking in an exhaust gas that is to be recirculated. An air cleaner (not illustrated) is connected to the intake manifold 3 via a compressor case 25 of a turbocharger 17. External air having been subjected to dust removal and purification by the air cleaner is sent to the intake manifold 3 through the compressor case 25, and is then supplied to cylinders of the diesel engine 1. With the configuration described above, part of an exhaust gas emitted from the diesel engine 1 to the exhaust manifold 6 is recirculated into the cylinders of the diesel engine 1 from the intake manifold 3 through the exhaust gas recirculation device 15. Consequently, a combustion temperature of the diesel engine 1 drops. Accordingly, an amount of nitrogen oxide (NOx) emitted from the diesel engine 1 is reduced, and fuel efficiency of the diesel engine 1 is enhanced.

Above the exhaust manifold 6, the turbocharger 17 is disposed. The turbocharger 17 includes the compressor case 25 including a built-in blower wheel and a turbine case 26 including a built-in turbine wheel. The exhaust manifold 6 has an outlet connected to an exhaust intake side of the turbine case 26. The turbine case 26 has an exhaust emission side connected to an exhaust intake side of the exhaust gas purification device 27. Namely, an exhaust gas emitted from the cylinders of the diesel engine 1 to the exhaust manifold 6 is discharged to the outside through components such as the turbocharger 17 and the exhaust gas purification device 27.

A coolant pump 21 by which coolant is caused to recirculate in the cylinder block 5 and a radiator 19 (see FIG. 16) is provided. The coolant pump 21 is disposed close to the side of the diesel engine 1 on which the cooling fan 24 is disposed. The coolant pump 21 and the cooling fan 24 are connected to the engine output shaft 4 via, e.g., a V-belt 22. With this configuration, the coolant pump 21 and the cooling fan 24 are driven. The coolant is sent from the coolant pump 21 into the cylinder block 5 via an EGR cooler 18 of the exhaust gas recirculation device 15, and cooling air is supplied from the cooling fan 24. Consequently, the diesel engine 1 is cooled.

As the exhaust gas purification device 27 for purifying an exhaust gas emitted from the cylinders of the diesel engine 1, a first exhaust gas purification case 28 (hereinafter, referred to as a first case 28) that is a oxidation catalyst (DOC) for removing particulate matters in the exhaust gas from the diesel engine 1 and a second exhaust gas purification case 29 (hereinafter, referred to as a second case 29) that is a urea selective catalytic reduction filter (SCRF) system for removing a nitrogen oxide in the exhaust gas from the diesel engine 1 are provided.

The first case 28, which is a DOC case, internally includes an oxidation catalyst 30 as an exhaust gas purification body. For example, the oxidation catalyst 30 is made of a wall-through type ceramic honeycomb or a metal mesh on which a catalytic component (e.g., platinum (Pt) and/or palladium (Pd)) for facilitating an oxidation reaction of carbon monoxide (CO) and/or hydrocarbon (HC) is carried. Thus, by causing an exhaust gas from the diesel engine 1 to pass through the first case 28, carbon monoxide (CO) and/or hydrocarbon (HC) in the exhaust gas is reduced.

The second case 29, which is an SCRF case, internally includes, as an exhaust gas purification body, an SCR filter 31 for urea selective catalytic reduction, an SCR catalyst 32 for urea selective catalytic reduction, and an ammonia slip catalyst (ASC) 33. The SCR filter 31 is made of, e.g., a particulate-matter (PM) collection filter to which an SCR catalyst component is applied. For example, the SCR filter 31 is made of a wall-flow type ceramic honeycomb on which a catalytic component (SCR catalyst component) for facilitating NOx selective catalytic reduction is carried. For example, the SCR catalyst 32 is made of a wall-through type ceramic honeycomb, a metal mesh, or the like on which a SCR catalyst component is carried. The ammonia slip catalyst 33 is an oxidation catalyst for oxidizing ammonia not reacted in the SCR filter 31 and the SCR catalyst 32. Thus, by causing an exhaust gas from the diesel engine 1 to pass through the second case 29, a nitrogen oxide (NOx) in the exhaust gas is reduced.

The first case 28 has an elongated cylindrical shape extending in parallel to the output shaft (crankshaft) 4 of the diesel engine 1 in a plan view. The second case 29 has an elongated cylindrical shape extending in a direction orthogonal to the output shaft 4 of the diesel engine 1 in a plan view. Namely, the exhaust gas purification device 27 includes the first case 28 and the second case 29 each of which has an elongated cylindrical shape and which are arranged in an L-shape in a plan view to extend along an outer periphery of the cylinder head 2 of the diesel engine 1.

The first case 28 has an exhaust gas inlet connected to an exhaust gas outlet of the turbine case 26 in the turbocharger 17, and also has a longitudinal intermediate portion connected to the cylinder head 2 via a case support bracket 34. The first case 28 is disposed adjacent to one side (right side) of the cylinder head 2, and is linearly aligned with the turbocharger 17 at a height substantially identical to that of the turbocharger 17. Namely, the first case 28 and the turbocharger 17 are connected in series above the exhaust manifold 6. Consequently, even in a case where the first case 28 of the exhaust gas purification device 27 is mounted in the diesel engine 1, the height of the diesel engine 1 can be made low. Thus, the diesel engine 1 can be mounted even in an engine room having a limited space.

The second case 29 is fixed above the flywheel housing 8 via a case support bracket 35. The second case 29 is positioned at a lower position than the first case 28. The first case 28 and the second case 29 are arranged in an L-shape such that a part 28a downstream in an exhaust gas traveling direction (hereinafter, such a part will be referred to as an exhaust-gas downstream part 28a) of the first case 28 and a part 29a upstream in the exhaust gas traveling direction (hereinafter, such a part will be referred to as an exhaust-gas upstream part 29a) of the second case 29 overlap each other in a top-and-bottom direction. The first case 28 and the second case 29 are connected to each other via an exhaust communicating tube 36 at the exhaust-gas downstream part 28a and the exhaust-gas upstream part 29a, which overlap each other in the top-and-bottom direction. A urea-water injection body 76 for injecting urea water into the first case 28 is fixed to a portion of an outer peripheral surface of the first case 28. This portion of an outer peripheral surface of the first case 28 is in the position in which the first case 28 and the second case 29 overlap each other in a plan view, and is not a portion of the first case 28 to which the exhaust communicating tube 36 is attached.

The first case 28 is rigidly supported, by the turbocharger 17 and the case support bracket 34, at a side surface (right side surface) of the diesel engine 1, the side surface being close to the exhaust manifold 6. Meanwhile, the second case 29 is rigidly supported, by the first case 28 and the case support bracket 35, at a side surface (back surface) of the diesel engine 1, the side surface being close to the flywheel housing 8. Consequently, the exhaust gas purification device 27 can be rigidly supported in a space adjacent to an outer periphery of the cylinder head 2 and above the exhaust manifold 6 and the flywheel housing 8. In addition, the diesel engine 1 provided with the exhaust gas purification device 27 can be made compact.

The first case 28 has a shape reduced toward a downstream side in the exhaust gas traveling direction such that a cross-section of the exhaust-gas downstream part 28a is smaller than that of a part 28b in which the exhaust gas purification body is mounted (hereinafter, such a part will be referred to as an exhaust-gas-purification-body mounted part 28b). The first case 28 is configured such that the exhaust-gas downstream part 28a is disposed closer to the center of the first case 28 than is the exhaust-gas-purification-body mounted part 28b. Consequently, an outer peripheral surface of the exhaust-gas downstream part 28a is closer to the center of the first case 28 than is an outer peripheral surface of the exhaust-gas-purification-body mounted part 28b. This can create, in the vicinity of the outer peripheral surface of the exhaust-gas downstream part 28a, a space in which the urea-water injection body 76 can be mounted.

The second case 29 has a shape reduced toward an upstream side in the exhaust gas traveling direction such that a cross-section of the exhaust-gas upstream part 29a is smaller than that of a part 29b in which the exhaust gas purification bodies 31 to 33 are mounted (hereinafter, such a part will be referred to as an exhaust-gas-purification-body mounted part 29b). The second case 29 is configured such that lower ends of exhaust-gas upstream part 29a and the exhaust-gas-purification-body mounted part 29b are positioned at substantially identical heights. This provides a sufficient space between the exhaust-gas downstream part 28a of the first case 28 and the exhaust-gas upstream part 29a of the second case 29, which are disposed to overlap each other in different positions in the top-and-bottom direction. Consequently, a urea mixing tube 39, which is internally included in the exhaust communicating tube 36 connecting the exhaust-gas downstream part 28a and the exhaust-gas upstream part 29a, achieves a length allowing urea water and an exhaust gas to be mixed together adequately.

Figure 15:
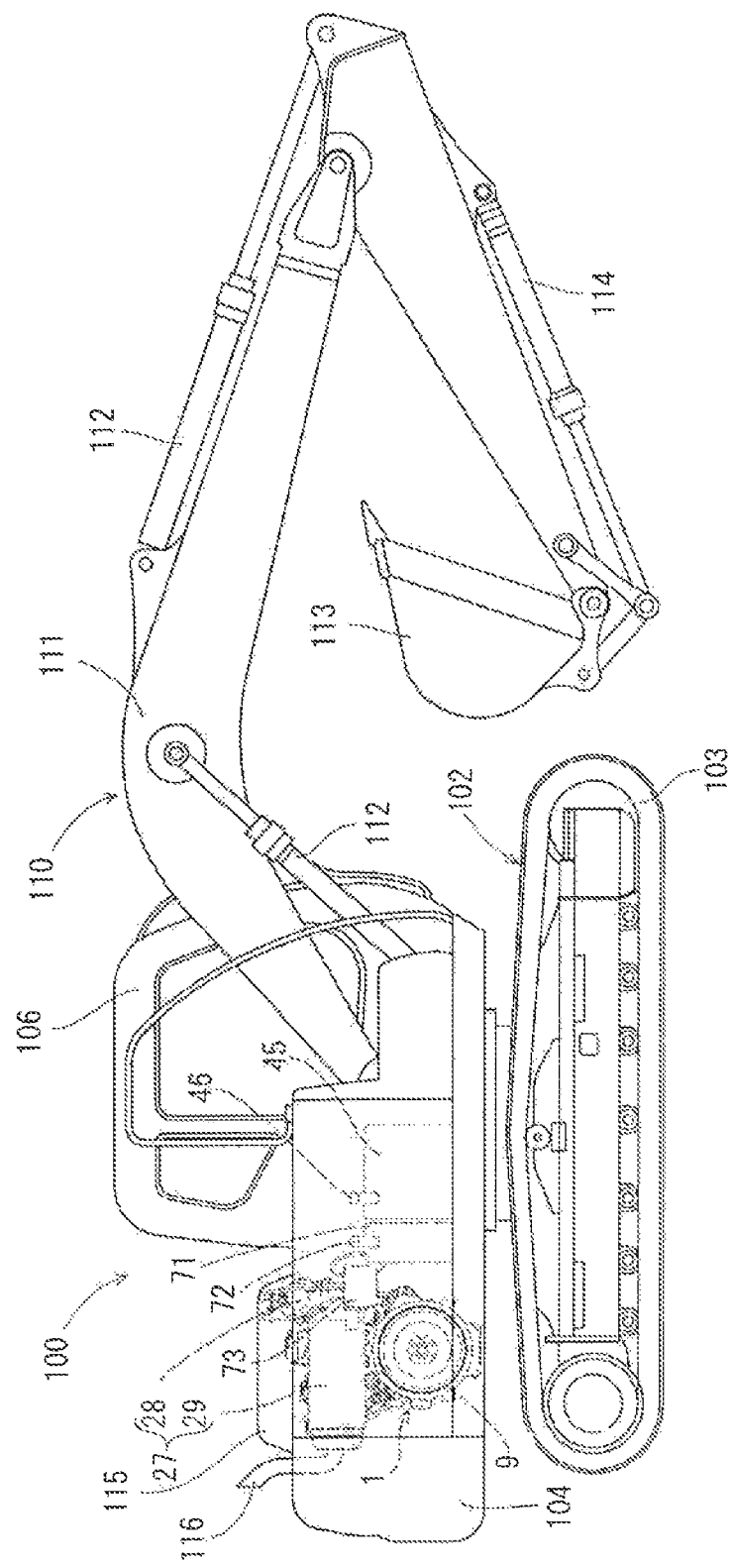
FIG. 15 illustrates a side view of a work vehicle in which the diesel engine is mounted.
Figure 16:
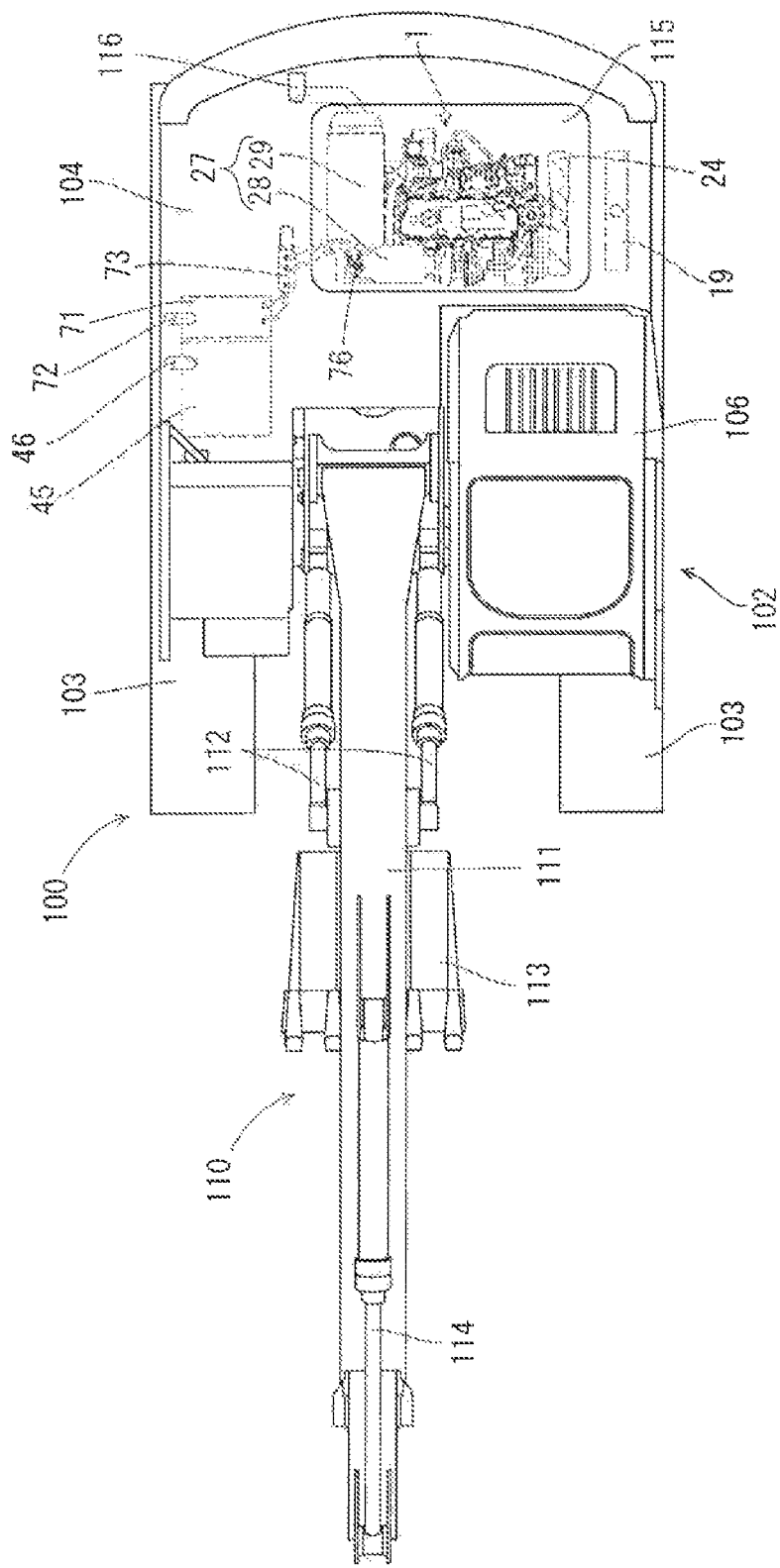
FIG. 16 illustrates a plan view of the work vehicle.

Injectors (not illustrated) in the respective cylinders of the diesel engine 1 are provided with a fuel pump 42 and a common rail 43 connected to a fuel tank 45 illustrated in FIG. 15 (FIG. 16). The cylinder head 2 has a side on which the intake manifold 3 is disposed, and the common rail 43 and a fuel filter 44 are disposed adjacent to that side of the cylinder head 2. The fuel pump 42 is provided to the cylinder block 5, which is located below the intake manifold 3. Each of the injectors has a fuel injection valve (not illustrated) of an electromagnetically-controlled opening and closing type.

A fuel in a fuel tank 45 is sucked into the fuel pump 42 through the fuel filter 44. Meanwhile, a discharge side of the fuel pump 42 is connected to the common rail 43, and the common rail 43, which has a cylindrical shape, is connected to the injectors of the diesel engine 1. A surplus of the fuel forcibly fed from the fuel pump 42 to the common rail 43 is returned to the fuel tank 45. Then, the high-pressure fuel is temporarily stored in the common rail 43, and the high-pressure fuel in the common rail 43 is supplied into the cylinders of the diesel engine 1.

With the configuration described above, the fuel in the fuel tank 45 is forcibly fed to the common rail 43 by the fuel pump 42, and the high-pressure fuel is stored in the common rail 43. In addition, the fuel injection valves of the injectors are controlled to be opened and closed, so that the high-pressure fuel in the common rail 43 is injected to the cylinders of the diesel engine 1. Namely, by electronically controlling the fuel injection valves of the injectors, it is possible to control a fuel injection pressure, a fuel injection timing, and a fuel injection period (fuel injection amount) with high accuracy. Consequently, it is possible to reduce a nitrogen oxide (NOx) emitted from the diesel engine 1.

Figure 5:
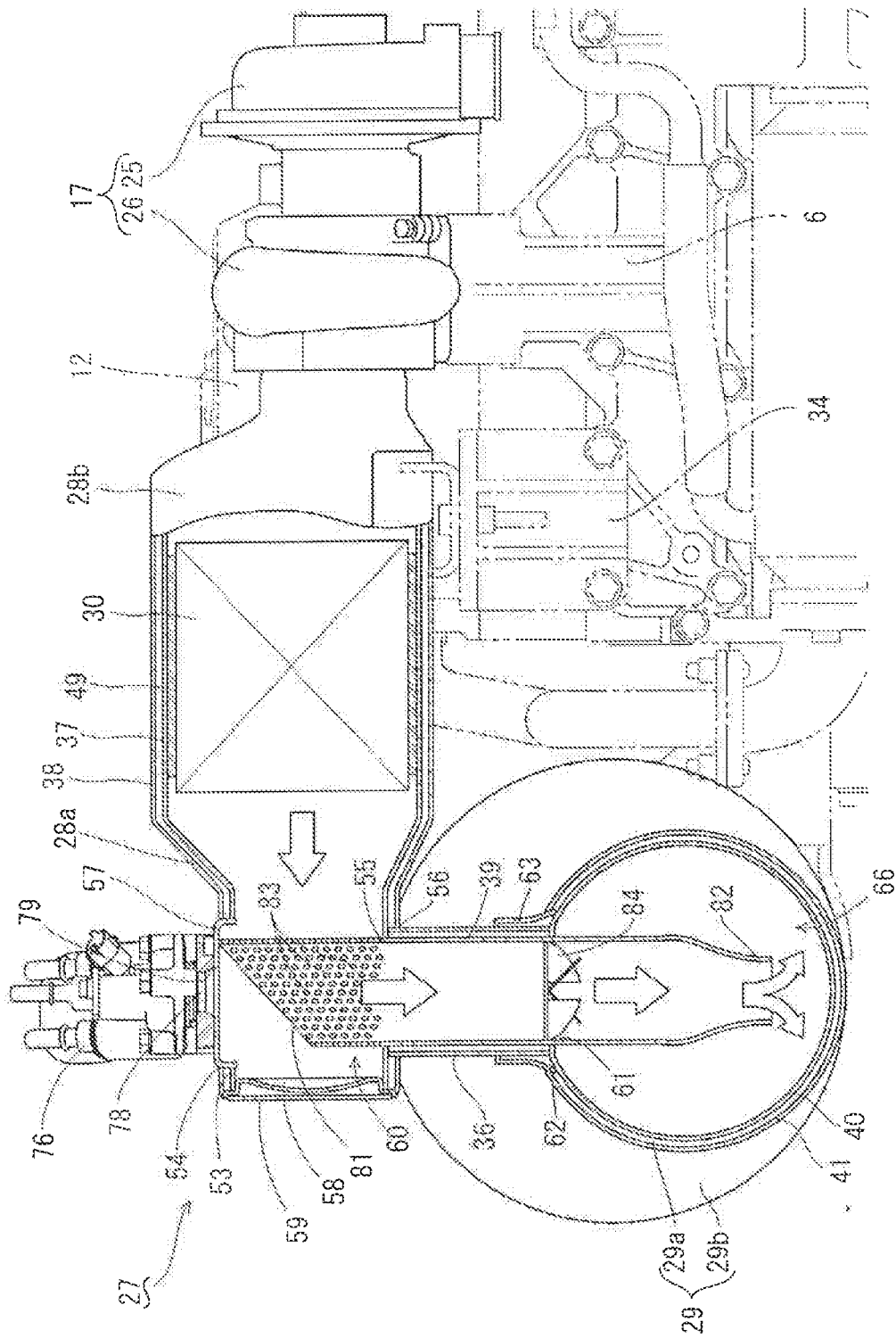
FIG. 5 illustrates an explanatory diagram showing a cross-section of an exhaust gas purification device according to the first embodiment, taken in a right side.
Figure 6:
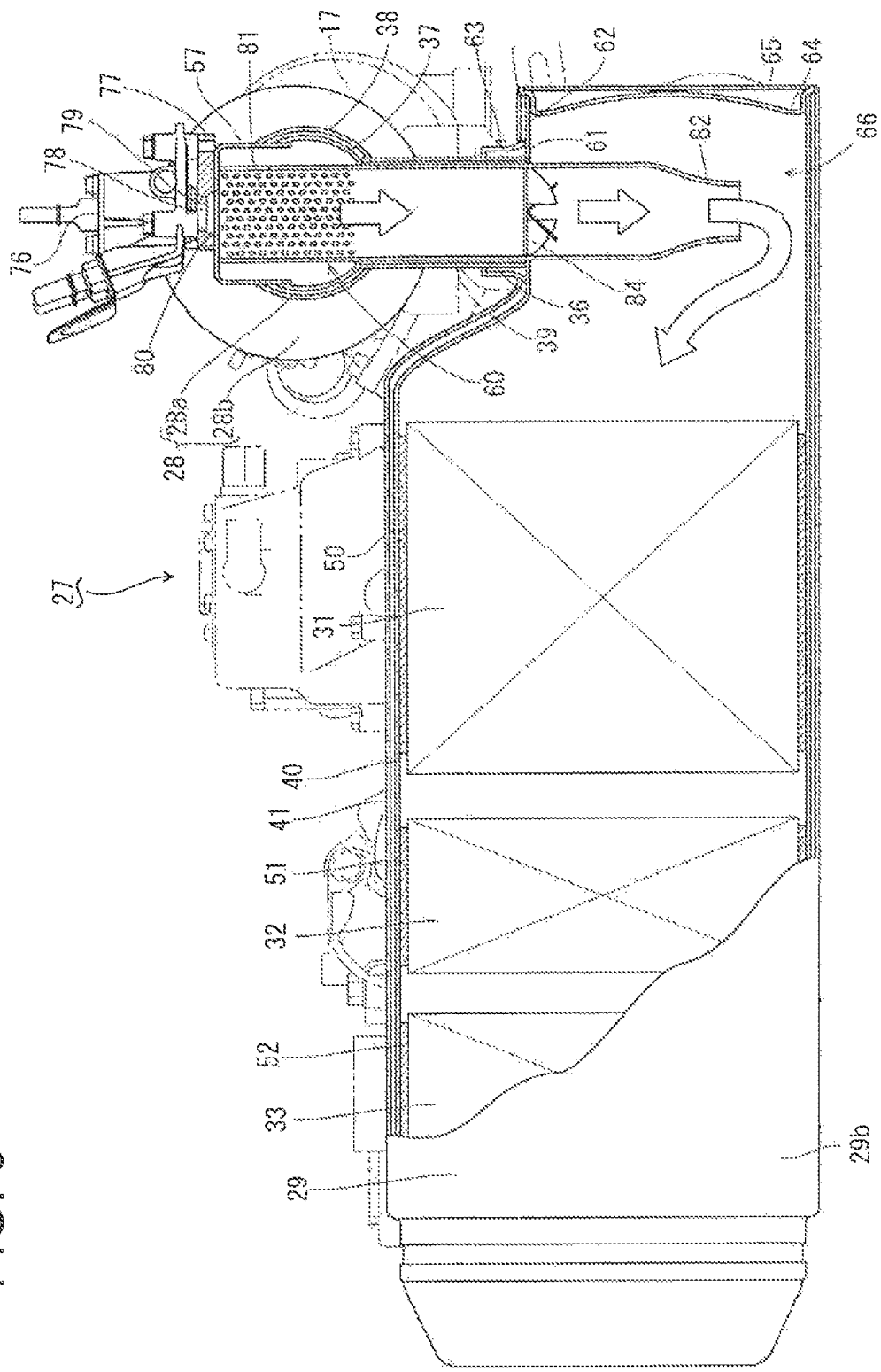
FIG. 6 illustrates an explanatory diagram showing a cross-section of the exhaust gas purification device according to the first embodiment, taken in a back side.

Next, with reference to FIGS. 5 and 6, a configuration of the exhaust gas purification device 27 will be described in detail. As illustrated in FIGS. 5 and 6, the exhaust gas purification device 27 includes the first case 28 having a double-tube structure constituted by a first inner case 37 and a first outer case 38, the second case 29 having a double-tube structure constituted by a second inner case 40 and a second outer case 41, and the exhaust communicating tube 36 via which the first case 28 and the second case 29 are connected to each other. The oxidation catalyst 30 is disposed inside the first inner case 37 that is made of a heat-resistant metallic material and has a substantially cylindrical shape, and the first inner case 37 is disposed inside the first outer case 38 that is made of a heat-resistant metallic material and has a substantially cylindrical shape. The SCR filter 31, the SCR catalyst 32, and the ammonia slip catalyst 33 are disposed inside the second inner case 40 that is made of a heat-resistant metallic material and has a substantially cylindrical shape, and the second inner case 40 is disposed inside the second outer case 41 that is made of a heat-resistant metallic material and has a substantially cylindrical shape.

As illustrated in FIG. 5, the first case 28 is configured such that the first inner case 37 externally covers, via a heat insulating material 49 that is in the shape of a mat and is made of ceramic fiber, the oxidation catalyst 30 that is a first exhaust gas purification body. Namely, the heat insulating material 49 is pressed into between the oxidation catalyst 30 and the first inner case 37 to protect the oxidation catalyst 30. In addition, the first outer case 38 externally covers the first inner case 37 with, e.g., a ring-shaped spacer (not illustrated) fitted between the first outer case 38 and the first inner case 37 so that an outer peripheral surface of the first inner case 37 and an inner peripheral surface of the first outer case 38 are apart from each other.

As illustrated in FIG. 6, the second case 29 is configured such that the second inner case 40 externally covers, via heat insulating materials 50 to 52 each of which is in the shape of a mat and is made of ceramic fiber, the SCR filter 31, the SCR catalyst 32, and the ammonia slip catalyst 33 that are a second exhaust gas purification body. Namely, the heat insulating materials 50 to 52 are respectively pressed into between the SCR filter 31 and the second inner case 40, between the SCR catalyst 32 and the second inner case 40, and between the ammonia slip catalyst 33 and the second inner case 40 to protect the SCR filter 31, the SCR catalyst 32, and the ammonia slip catalyst 33. In addition, the second outer case 41 externally covers the second inner case 40 with, e.g., a ring-shaped spacer (not illustrated) fitted between the second outer case 41 and the second inner case 40 so that an outer peripheral surface of the second inner case 40 and an inner peripheral surface of the second outer case 41 are apart from each other.

As illustrated in FIGS. 5 and 6, the first case 28 is configured such that the exhaust-gas downstream part 28a, which is downstream of the oxidation catalyst 30 in the exhaust gas traveling direction, has a smaller diameter than that of the exhaust-gas-purification-body mounted part 28b, in which the oxidation catalyst 30 is mounted. Namely, parts of the first inner case 37 and the first outer case 38 corresponding to the exhaust-gas downstream part 28a respectively have smaller diameters than those of parts of the first inner case 37 and the first outer case 38 corresponding to the exhaust-gas-purification-body mounted part 28b. The parts of the first inner case 37 and the first outer case 38 corresponding to the exhaust-gas downstream part 28a have through-holes 53 to 56 arranged in the top-and-bottom direction.

Through the through-holes 53 and 54 respectively provided in upper portions of the first inner case 37 and the first outer case 38, an injection-body mounting case 57 to which the urea-water injection body 76 is fixed is inserted. The injection-body mounting case 57 is fixed in upper portions of the parts of the first inner case 37 and the first outer case 38 corresponding to the exhaust-gas downstream part 28a such that an outer peripheral surface of the injection-body mounting case 57 is in contact with inner peripheries of the through-holes 53 and 54 of the first inner case 37 and the first outer case 38. With this configuration, it is possible to guide urea water from the urea-water injection body 76 into the first inner case 37, and to prevent intrusion of urea water and/or an exhaust gas into a space between the first inner case 37 and the first outer case 38.

Through the through-hole 55 of the first inner case 37, the urea mixing tube 39 is inserted. Through the through-hole 56 of the first outer case 38, the urea mixing tube 39 and an exhaust communicating tube 36, which covers an outer surface of the urea mixing tube 39, are inserted. The exhaust communicating tube 36 is fixed in lower portions of the parts of the first inner case 37 and the first outer case 38 corresponding to the exhaust-gas downstream part 28a. Specifically, an upstream end of the exhaust communicating tube 36 in the exhaust gas traveling direction is in contact with a portion of the outer peripheral surface of the first inner case 37, the portion being outward from the through-hole 55. In addition, an outer peripheral surface of the exhaust communicating tube 36 is in contact with an inner periphery of the through-hole 56 of the first outer case 38. An outer peripheral surface of the urea mixing tube 39 is in contact with and fixed to an inner periphery of the through-hole 55 of the first inner case 37. In addition, an upstream end of the urea mixing tube 39 in the exhaust gas traveling direction is inserted to reach the injection-body mounting case 57. Consequently, a connected portion between the first case 28 and the second case 29 can achieve a double-tube structure having a high heat insulating property. Furthermore, it is possible to prevent intrusion of urea water and/or an exhaust gas into the space between the first inner case 37 and the first outer case 38.

The first inner case 37 and the first outer case 38 have respective exhaust-outlet-side ends to which an exhaust-outlet-side inner lid 58 shaped in a circular disc is fixedly attached. In addition, an exhaust-outlet-side outer lid 59 is fixed to face an outer surface of the exhaust-outlet-side inner lid 58. The oxidation catalyst 30 has an end surface on a downstream side in the exhaust gas traveling direction, and this end surface of the oxidation catalyst 30 is apart from the exhaust-outlet-side inner lid 58 by a certain distance. Consequently, an upstream-side urea mixing chamber 60 is created between the oxidation catalyst 30 and the exhaust-outlet-side inner lid 58 inside the part of the first inner case 37 corresponding to the exhaust-gas downstream part 28a. The upstream-side urea mixing chamber 60 receives the urea mixing tube 39 externally inserted thereinto.

As illustrated in FIGS. 5 and 6, the second case 29 is configured such that the exhaust-gas upstream part 29a, which is upstream of the SCR filter 31 in the exhaust gas traveling direction, has a smaller diameter than that of the exhaust-gas-purification-body mounted part 29b, in which the SCR filter 31, the SCR catalyst 32, and the ammonia slip catalyst 33 are mounted. Namely, parts of the second inner case 40 and the second outer case 41 corresponding to the exhaust-gas upstream part 29a respectively have smaller diameters than those of parts of the second inner case 40 and the second outer case 41 corresponding to the exhaust-gas-purification-body mounted part 29b. Through-holes 61 and 62 are respectively provided in upper portions of the parts of the second inner case 40 and the second outer case 41 corresponding to the exhaust-gas upstream part 29a. An exhaust inlet tube 63 is disposed on the outer peripheral surface of the second inner case 40. An exhaust outlet side of the exhaust inlet tube 63 covers the through-hole 61, and an exhaust inlet side of the exhaust inlet tube 63 protrudes outward from the through-hole 62 of the second outer case 41.

Into the through-hole 61 of the second inner case 40, the urea mixing tube 39 is inserted. Into the exhaust inlet tube 63, the urea mixing tube 39 and the exhaust communicating tube 36, which covers the outer surface of the urea mixing tube 39, are inserted. The exhaust communicating tube 36 is fixed in upper portions of the parts of the second inner case 40 and the second outer case 41 corresponding to the exhaust-gas upstream part 29a. Specifically, a downstream end of the exhaust communicating tube 36 in the exhaust gas traveling direction is in contact with a portion of the outer peripheral surface of the second inner case 40, the portion being outward from the through-hole 61. In addition, the outer peripheral surface of the exhaust communicating tube 36 is in contact with an inner periphery of the exhaust inlet of the exhaust inlet tube 63. The outer peripheral surface of the urea mixing tube 39 is in contact with and fixed to an inner periphery of the through-hole 61 of the second inner case 40. In addition, a downstream end of the urea mixing tube 39 in the exhaust gas traveling direction is inserted to reach the inside of the second inner case 40. Consequently, a connected portion between the first case 28 and the second case 29 can achieve a double-tube structure having a high heat insulating property. Furthermore, it is possible to prevent intrusion of urea water and/or an exhaust gas into a space between the second inner case 40 and the second outer case 41.

The second inner case 40 and the second outer case 41 have respective exhaust-inlet-side ends to which an exhaust-inlet-side inner lid 64 shaped in a circular disc is fixedly attached. In addition, an exhaust-inlet-side outer lid 65 is fixed to face an outer surface of the exhaust-inlet-side inner lid 64. The SCR filter 31 has an end surface on an upstream side in the exhaust gas traveling direction, and this end surface of the SCR filter 31 is apart from the exhaust-inlet-side inner lid 64 by a certain distance. Consequently, a downstream-side urea mixing chamber 66 is created between the SCR filter 31 and the exhaust-inlet-side inner lid 64 inside the part of the second inner case 40 corresponding to the exhaust-gas upstream part 29a. The downstream-side urea mixing chamber 66 receives the urea mixing tube 39 externally inserted thereinto.

As illustrated in FIGS. 5 and 6, the urea-water injection body 76 is attached, via an injection seat 77, to the injection-body mounting case 57 disposed in the exhaust-gas downstream part 28a of the first case 28. The urea-water injection body 76 sprays an aqueous urea solution into the upstream-side urea mixing chamber 60 in the first inner case 37. The urea-water injection body 76 has a urea-water injection valve 78 protruding downward to be inserted into a nozzle mounting hole 79 provided in the injection seat 77. The urea-water injection body 76 is disposed on the injection-body mounting case 57 such that the position of the nozzle mounting hole 79 penetrating through the injection seat 77 coincides with the position of a urea-water guide hole 80 penetrating through the injection-body mounting case 57. Consequently, urea water injected from the urea-water injection valve 78 of the urea-water injection body 76 is guided, through the nozzle mounting hole 79 and the urea-water guide hole 80, into the urea mixing tube 39 disposed inside the upstream-side urea mixing chamber 60.

As illustrated in FIGS. 5 and 6, the urea mixing tube 39 has a mixing tube inlet 81 at an upper end of the urea mixing tube 39, and also has a mixing tube outlet 82 at a lower end of the urea mixing tube 39. The mixing tube inlet 81 is inserted into the upstream-side urea mixing chamber 60 created near the exhaust outlet of the first case 28, whereas the mixing tube outlet 82 is inserted into the downstream-side urea mixing chamber 66 created near the exhaust inlet of the second case 29. The urea mixing tube 39 has an intermediate portion between the first case 28 and the second case 29, and an outer peripheral surface of the intermediate portion is covered with the exhaust communicating tube 36, which is connected to the first case 28 and the second case 29. Thus, the urea mixing tube 39 is covered with the first case 28, the second case 29, and the exhaust communicating tube 36. This provides a heat insulating layer over the outer peripheral surface of the urea mixing tube 39. Consequently, the inside of the urea mixing tube 39 can be maintained at a high temperature. This makes it possible to suppress or reduce the phenomenon that a crystal lump of a urea component is formed in the urea mixing tube 39.

The urea mixing tube 39 has the end serving as the mixing tube inlet 81 with a obliquely-cut shape (a obliquely-cut circular cylinder shape). Specifically, the mixing tube inlet 81 of the urea mixing tube 39 has a tube wall becoming lower from a side close to the oxidation catalyst 30 (i.e., the oxidation catalyst 30 side) toward a side close to the exhaust-outlet-side inner lid 58. Namely, the mixing tube inlet 81 of the urea mixing tube 39 is configured such that a portion of the tube wall on the oxidation catalyst 30 side is in contact with a portion of an inner peripheral surface of the injection-body mounting case 57, the portion being outward from the urea-water guide hole 80. Consequently, the mixing tube inlet 81 of the urea mixing tube 39 is configured to have a closed space on the oxidation catalyst 30 side. Meanwhile, the mixing tube inlet 81 of the urea mixing tube 39 is opened toward the exhaust-outlet-side inner lid 58. An inner peripheral surface of the mixing tube inlet 81 of the urea mixing tube 39 is located outward from the urea-water guide hole 80 of the injection-body mounting case 57. The tube wall of the urea mixing tube 39 has an inserted portion that is inserted into the first case 28. This inserted portion has a plurality of exhaust introduction holes 83 and thus is porous.

As described above, the tube wall of the mixing tube inlet 81 of the urea mixing tube 39 has a height increasing toward the oxidation catalyst 30. Due to such a shape of the mixing tube inlet 81, most of an exhaust gas having passed through the oxidation catalyst 30 makes a detour and is introduced into the urea mixing tube 81 from the exhaust-outlet-side inner lid 58 side. Thus, the obliquely-cut opening and the exhaust introduction holes 83 of the mixing tube inlet 81 each function as an exhaust introduction opening allowing an exhaust gas to be introduced into the urea mixing tube 39. Consequently, a flow velocity of the exhaust gas introduced into the urea mixing tube 39 can be made uniform. As a result, urea water sprayed from the urea-water injection valve 78 toward the mixing tube inlet 81 of the urea mixing tube 39 becomes more likely to be stirred and dispersed. This improves the evaporativity of the urea component at a low temperature, and also enhances the reaction efficiency between the exhaust gas and the urea component.

The urea mixing tube 39 has the end serving as the mixing tube outlet 82 and being narrowed (tapered) toward a distal end thereof. Namely, a diameter of the mixing tube outlet 82 is reduced toward the distal end. In addition, the mixing tube outlet 82 extends toward a portion of an inner wall surface of the second case 29, the portion being opposite to the exhaust inlet tube 63. Although the mixing tube outlet 82 of the urea mixing tube 39 extends into the second inner case 40 of the second case 29, the mixing tube outlet 82 is located apart from an inner wall surface of the second inner case 40.

As described above, the mixing tube outlet 82 of the urea mixing tube 39 is squeezed toward the distal end. Due to such a shape of the mixing tube outlet 82, urea water is caused to collide with an inner wall surface of the mixing tube outlet 82 at the distal end. Thus, the exhaust gas and an unreacted urea component are caused to collide with the mixing tube outlet 82, so as to be evaporated. This facilitates a reaction between the exhaust gas and the urea component in the downstream-side urea mixing chamber 66 in the second case 29. Furthermore, it is possible to prevent the urea component from reaching the inner wall surface of the second inner case 40, thereby suppressing or reducing the phenomenon that a crystal lump is formed on the inner wall surface of the second inner case 40.

The urea mixing tube 39 internally includes, at a location downstream of the portion in which the exhaust introduction holes 83 are bored, a mixer 84 for facilitating mixing of the urea water and the exhaust gas together. For example, the mixer 84 includes a plurality of blades arranged radially in point symmetry with respect to a central axis of the urea mixing tube 39. The mixer 84 causes the urea water to be mixed and dispersed in the exhaust gas. The mixer 84 is disposed at a location from which the urea mixing tube 39 is inserted into the second case 29 (i.e., a location near the through-holes 61 and 62). Thus, the mixer 84 is fixed at a location upstream of the mixing tube outlet 82 of the urea mixing tube 39 when viewed in the exhaust gas traveling direction.

As described above, the mixer 84 is disposed inside the second case 29, which has a high heat-insulating property. Consequently, it is possible to suppress or reduce a temperature drop in the mixer 84. In addition, since the exhaust gas whose flow velocity has been made uniform at the mixing tube inlet 81 flows into the mixer 84, the mixer 84 achieves rotatability free from fluctuations. This facilitates mixing of the urea water with the exhaust gas, thereby making it possible to enhance the evaporativity of the urea component. Thus, the above configuration can prevent crystallization of the urea component in the mixer 84. Not only this, the above configuration can facilitate a reaction between the exhaust gas and the urea component, and can suppress or reduce the phenomenon that the urea water in the form of droplets enters the second case 29. In addition, due to the configuration in which the mixing tube outlet 82 downstream of the mixer 84 has a tapered shape, the urea water having passed through the mixer 84 and being in the form of droplets is caused to collide with the mixing tube outlet 82. This prevents the urea component from reaching the inner wall surface of the second inner case 40.

Figure 7:
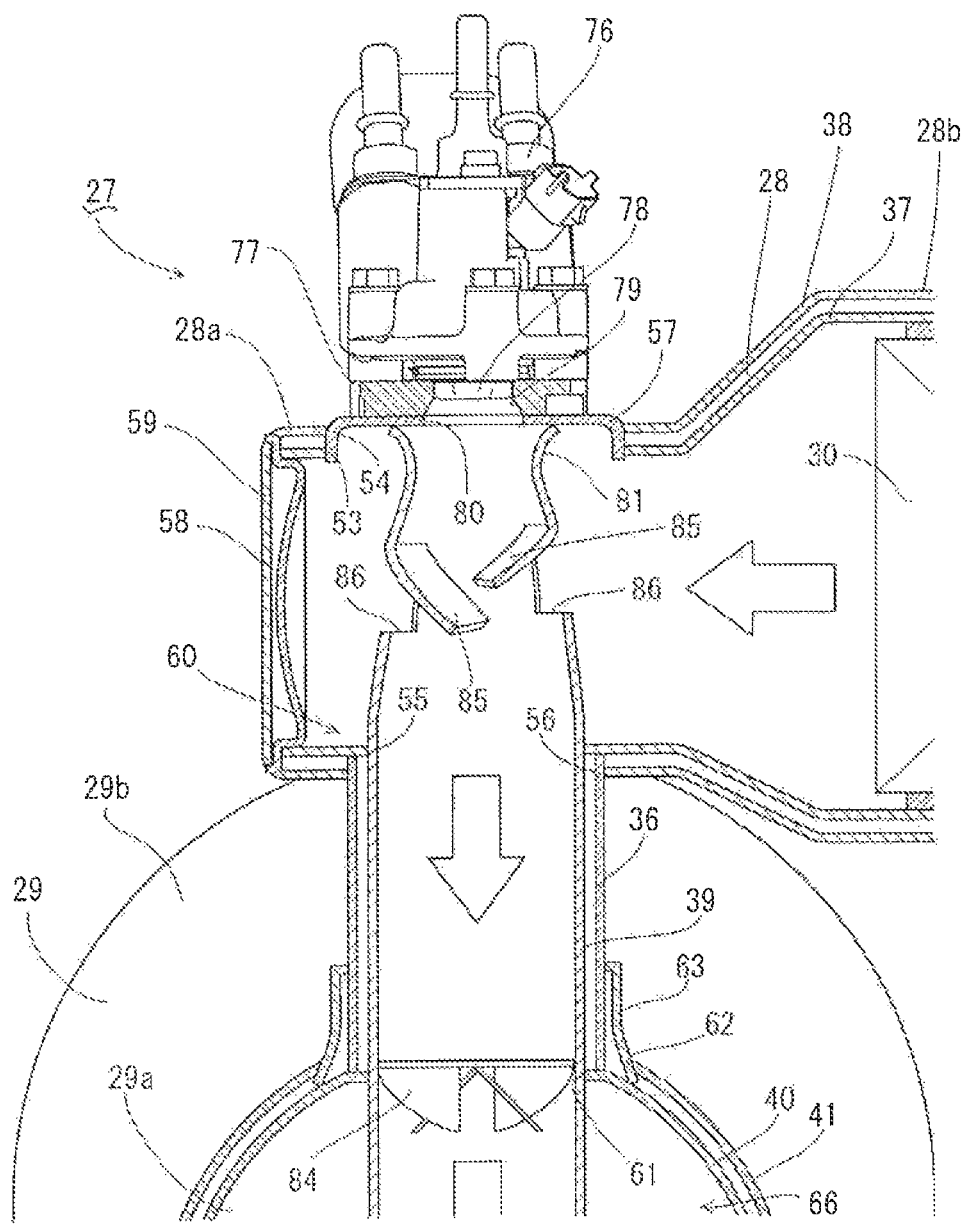
FIG. 7 illustrates an explanatory diagram showing a cross-section of an exhaust gas purification device including a urea mixing tube according to a first modification, taken in a right side.
Figure 8:
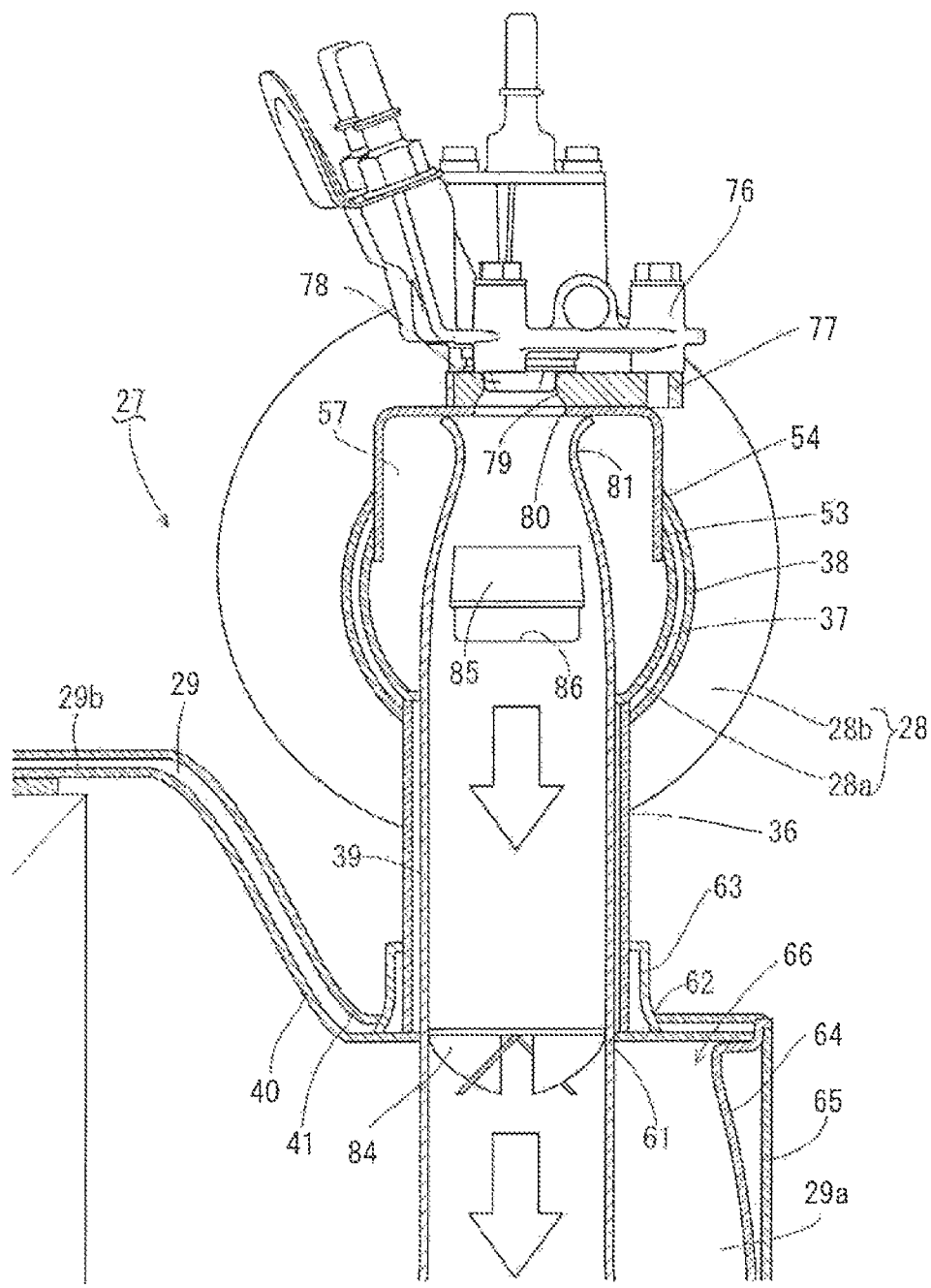
FIG. 8 illustrates an explanatory diagram showing a cross-section of the exhaust gas purification device including the urea mixing tube according to the first modification, taken in a back side.

Next, with reference to FIGS. 7 and 8, a first modification of the urea mixing tube 39 will be described. In the present modification, as illustrated in FIGS. 7 and 8, a mixing tube inlet 81 of a urea mixing tube 39 has a bell-mouth shape. In addition, the mixing tube inlet 81 has an expanded distal end and is in contact with a portion of an injection-body mounting case 57, the portion being outward from a urea-water guide hole 80 of the injection-body mounting case 57. The urea mixing tube 39 has an inserted portion that is inserted into a first case 28. A tube wall of the inserted portion of the urea mixing tube 39 is partially bent toward the inside of the urea mixing tube 39, and the bent part of the tube wall functions as a urea collision plate 85. As a result of cutting the tube wall of the urea mixing tube 39 to yield the urea collision plate 85, an opening is created. This opening functions as an exhaust introduction opening 86 allowing an exhaust gas having passed through an oxidation catalyst 30 to be introduced into the urea mixing tube 39.

The urea mixing tube 39 includes a plurality of urea collision plates 85 that are bent parts of the tube wall of the urea mixing tube 39. Each of the urea collision plates 85 extends in a direction toward the center of the urea mixing tube 39 and away from a urea-water injection valve 78. The urea mixing tube 39 has the exhaust introduction openings 86 each opened downward from a position at which a respective one of the urea collision plates 85 is bent. Consequently, the urea mixing tube 39 has a reduced diameter, i.e., is narrowed (squeezed) at a location in which the urea collision plates 85 are provided. The urea mixing tube 39 has a shape whose cross-section is continuously increased toward a downstream side (downward) from the location at which the urea collision plates 85 are provided.

Due to the configuration in which the mixing tube inlet 81 of the urea mixing tube 39 has a bell-mouth shape, a urea component from the urea-water injection valve 78 is hardly adhered to the tube wall of the urea mixing tube 39. Furthermore, due to the configuration in which the inserted portion of the urea mixing tube 39 that is inserted into the first case 28 is squeezed at the location in which the exhaust introduction openings 86 are provided, it is possible to increase a flow velocity of an exhaust gas introduced through the exhaust introduction openings 86, thereby facilitating a temperature increase in the tube wall of the urea mixing tube 39. Moreover, due to the configuration in which the tube wall of the urea mixing tube 39 is gradually expanded toward lower through-holes 55 and 56 of the first case 28, it is possible to suppress or reduce a temperature drop in the tube wall of the urea mixing tube 39. Consequently, it is possible to reduce the phenomenon that a crystal lump of a urea component is formed on an inner wall surface of the urea mixing tube 39, thereby making it possible to easily prevent an increase in exhaust resistance in the urea mixing tube 39 that may otherwise be caused by, e.g., growth of the urea crystal lump.

Due to the configuration in which the urea mixing tube 39 includes the urea collision plates 85 located downstream (downward) of the urea-water injection valve 78, urea water injected from the urea-water injection valve 78 is caused to collide with the urea collision plates 85. Consequently, the urea water can be easily made into fine particles. This facilitates a reaction between the urea component and the exhaust gas. With a greater inclination angle (an angle at which the urea water collides with each of the urea collision plates 85) of each of the urea collision plates 85 with respect to a direction in which the urea water is injected from the urea-water injection valve 78, the urea water hardly forms a liquid membrane on the parts of the tube wall corresponding to the urea collision plates 85. Consequently, it is possible to suppress or reduce formation of a crystal lump of the urea component.

In addition, due to the configuration in which the urea collision plates 85 are made of the parts of the tube wall of the urea mixing tube 39 and the exhaust introduction openings 86 are provided in the tube wall of the urea mixing tube 39, the urea collision plates 85 are exposed to the exhaust gas having a high temperature and accordingly the temperatures of the urea collision plates 85 can be increased. Consequently, even in a case where the urea water injected from the urea-water injection valve 78 collides with the urea collision plates 85, it is possible to suppress or reduce the phenomenon that a crystal lump of the urea component is formed on the urea collision plates 85.

In addition, the inserted portion of the urea mixing tube 39 that is inserted into the first case 28 is squeezed at a location downstream of the mixing tube inlet 81, and the urea collision plates 85 are provided at the squeezed location. This configuration makes it possible to increase a flow velocity of the exhaust gas at the location in which the urea collision plates 85 are provided. This facilitates heat exchange between the urea collision plates 85 and the exhaust gas. Consequently, it is possible to effectively increase the temperatures of the urea collision plates 85.

Figure 9:
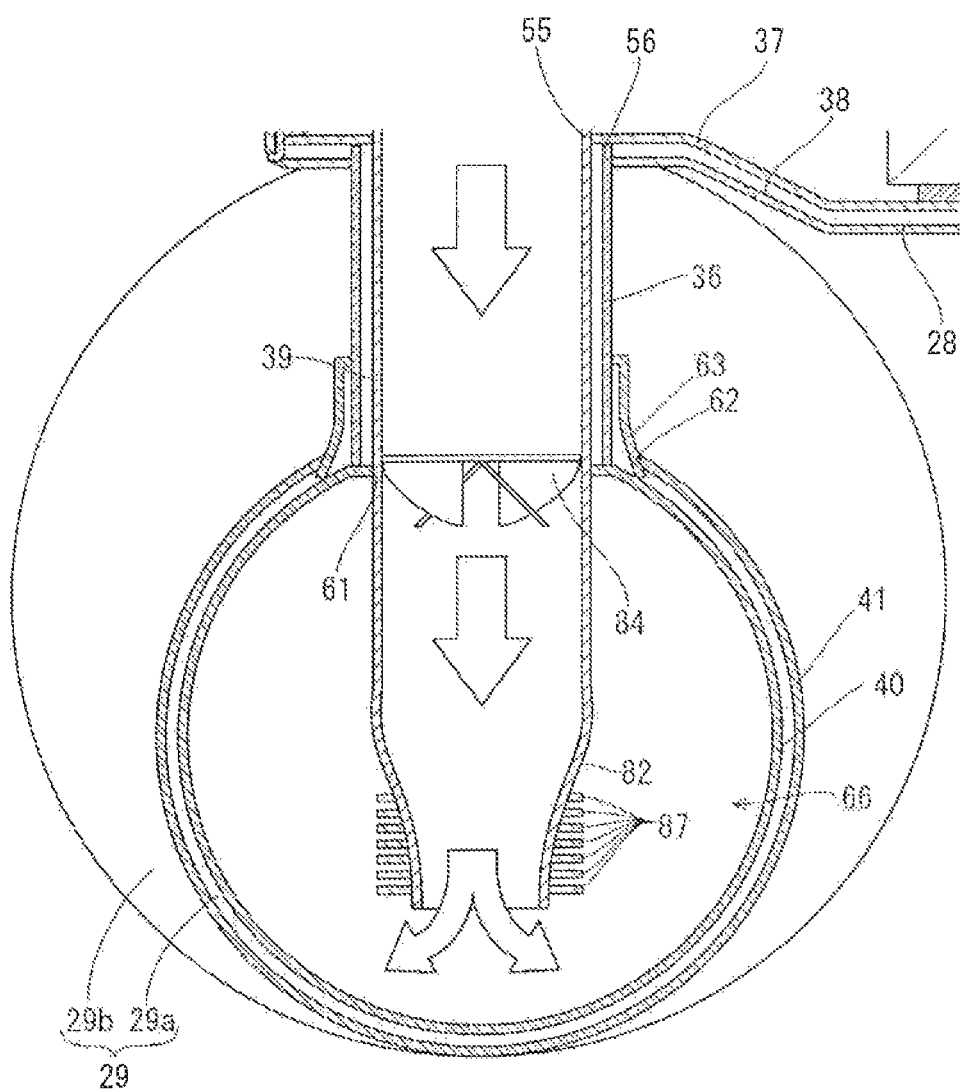
FIG. 9 illustrates an explanatory diagram showing a cross-section of an exhaust gas purification device including a urea mixing tube according to a second modification, taken in a right side.
Figure 10:
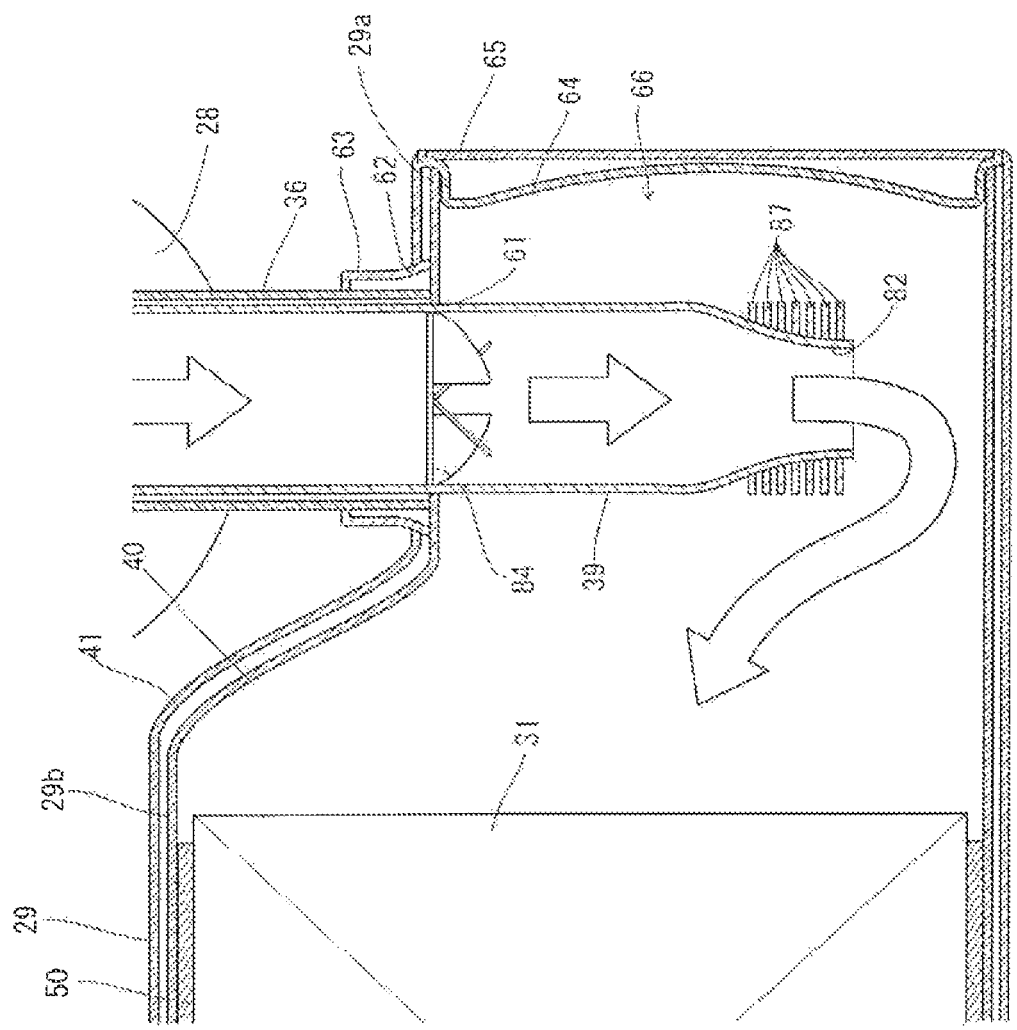
FIG. 10 illustrates an explanatory diagram showing a cross-section of the exhaust gas purification device including the urea mixing tube according to the second modification, taken in a back side.

Next, with reference to FIGS. 9 and 10, a second modification of the urea mixing tube 39 will be described. In the present modification, as illustrated in FIGS. 9 and 10, a mixing tube outlet 82 of a urea mixing tube 39 has an outer peripheral surface provided with a plurality of heat exchange fins 87 protruding outwardly. Due to the heat exchange fins 87 provided to the mixing tube outlet 82, it is possible to suppress or reduce, by a temperature atmosphere in a second case 29, a temperature drop in a tube wall of an inserted portion of the mixing tube outlet 82, the inserted portion having been inserted into a downstream-side urea mixing chamber 66. Consequently, it is possible to improve the evaporativity of a urea component that collides with the tube wall of the mixing tube outlet 82, thereby facilitating a reaction between the urea component and an exhaust gas. Note that the present modification can be combined with the configuration of the first modification.

Figure 11:
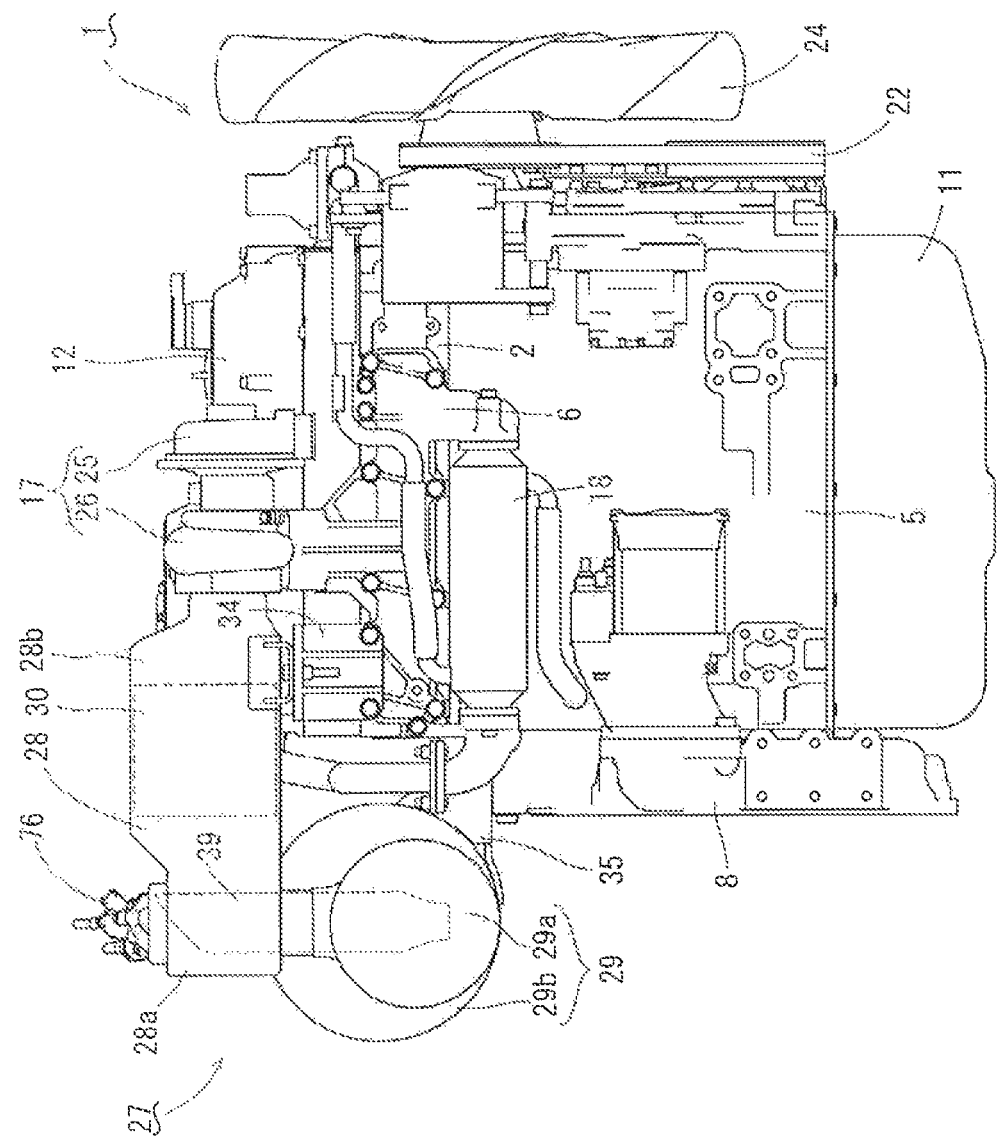
FIG. 11 illustrates a right side view of a diesel engine according to a second embodiment.
Figure 12:
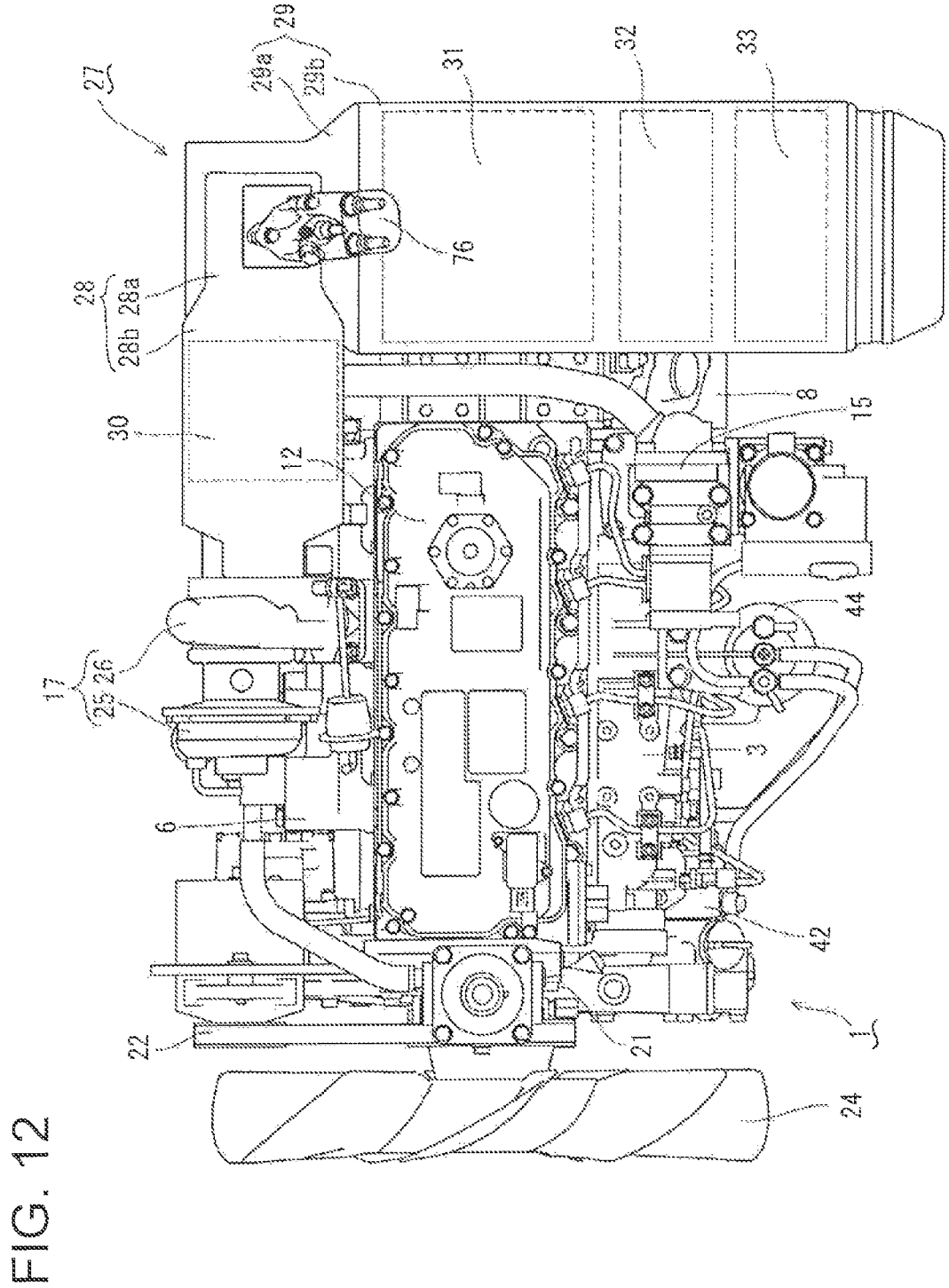
FIG. 12 illustrates a plan view of the diesel engine according to the second embodiment.
Figure 13:
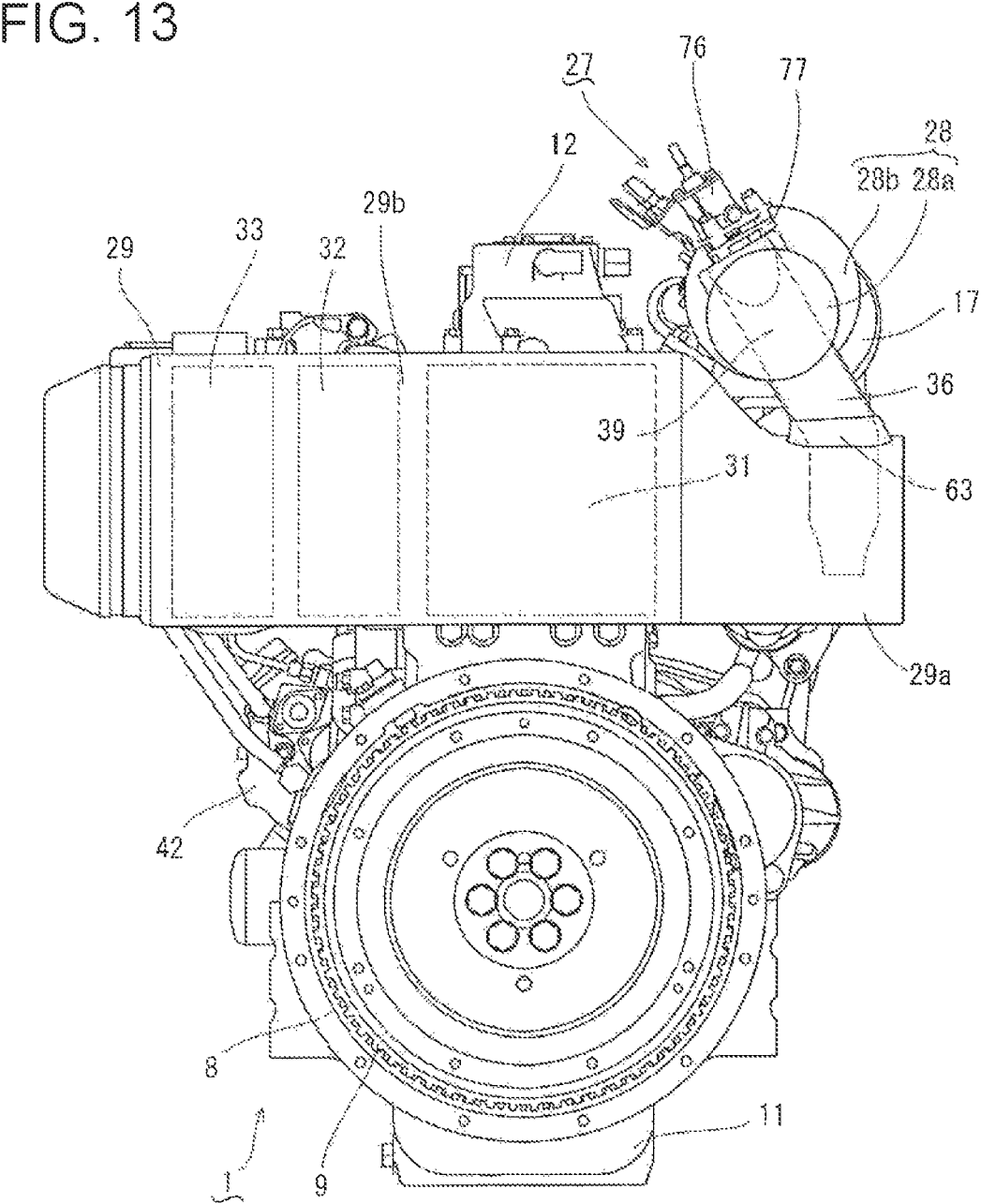
FIG. 13 illustrates a back view of the diesel engine according to the second embodiment.
Figure 14:
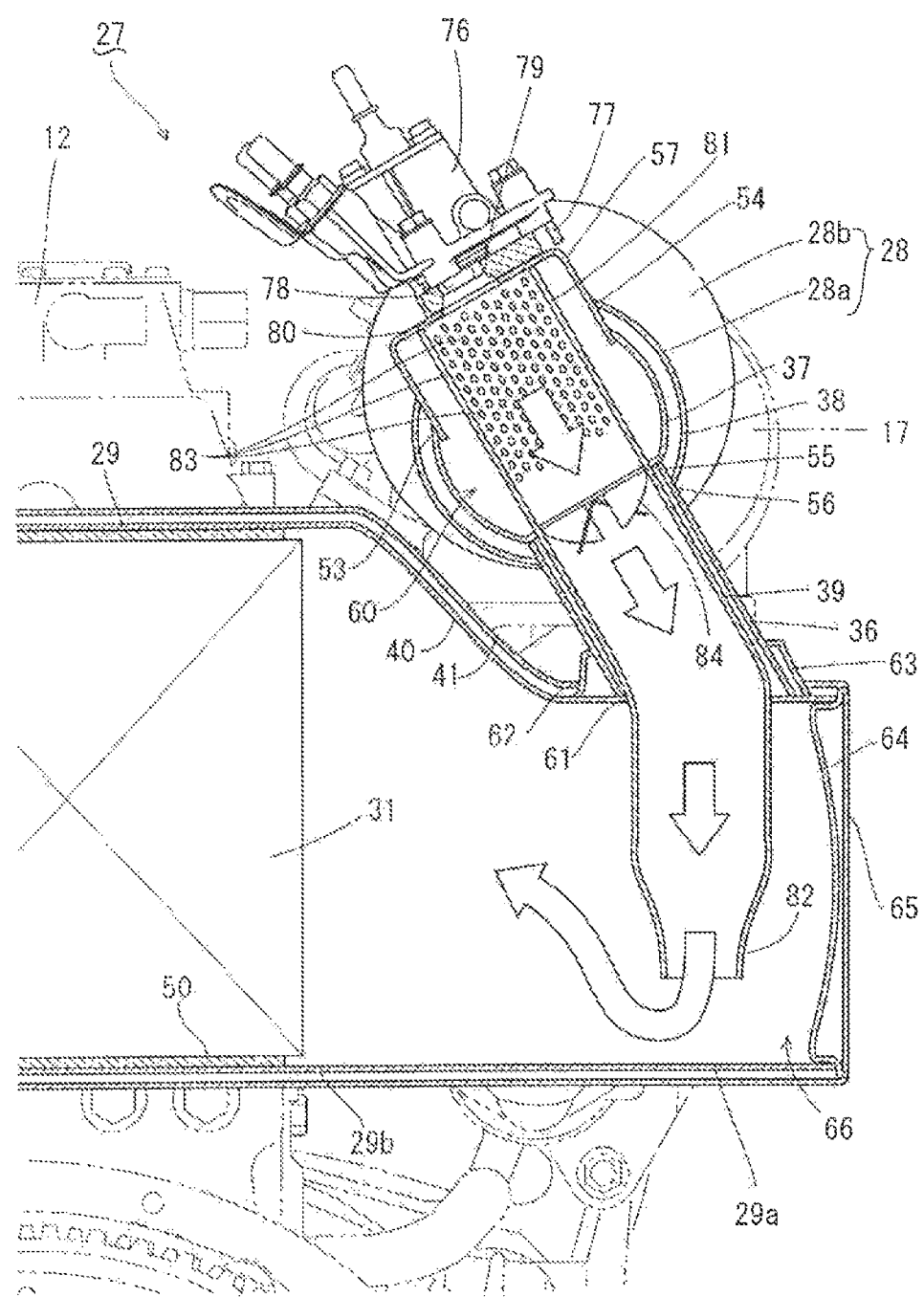
FIG. 14 illustrates an explanatory diagram showing a cross-section of an exhaust gas purification device according to the second embodiment, taken in a back side.

With reference to the drawings (FIGS. 11 to 14), the following will describe a second embodiment in which the present invention is implemented. FIG. 11 is a right side view of a diesel engine 1, showing a right side on which an exhaust manifold 6 is disposed. FIG. 12 is a plan view of the diesel engine 1, showing a side on which a cylinder head cover 12 is disposed. FIG. 13 is a back view of the diesel engine 1, showing a side on which a flywheel housing 8 is disposed. Note that components and parts/portions of an engine device of the present embodiment identical to those of the engine device of the first embodiment are given identical reference signs, and detailed description thereof is omitted.

With reference to FIGS. 11 to 14, the following will describe a connection structure of an exhaust gas purification device 27 according to the present embodiment. As illustrated in FIGS. 11 to 14, in the exhaust gas purification device 27 of the present embodiment, a urea-water injection body 76 is fixed to a portion of an outer peripheral surface of an exhaust-gas downstream part 28a of a first case 28, the portion being located inward (i.e., closer to the cylinder head cover 12) from the top of the first case 28.

Parts of a first inner case 37 and a first outer case 38 of the first case 28 corresponding to the exhaust-gas downstream part 28a respectively have through-holes 53 and 54 located leftward of the top of the first case 28 (i.e., closer to the cylinder head cover 12). An injection-body mounting case 57 is mounted through the through-holes 53 and 54 in the first case 28 such that the injection-body mounting case 57 extends obliquely toward the lower right. Consequently, a surface of the injection-body mounting case 57 on which the urea-water injection body 76 is to be mounted is inclined toward the cylinder head cover 12 (to the left). Thus, the urea-water injection body 76 is mounted inclined. As a result, the urea-water injection body 76 is supported at a low position above the diesel engine 1. Thus, the top surface side of the diesel engine 1 can be made low.

The urea mixing tube 39 is inserted into the first case 28 from a lower portion of the first case 28, the lower portion being outside of and lateral to (at the right side of) the engine device. In addition, a mixing tube inlet 81 of the urea mixing tube 39 extends toward the urea-water injection body 76 (toward the upper left). Namely, the mixing tube inlet 81 of the urea mixing tube 39 is inserted into the first inner case 37 through through-holes 55 and 56 located in the lower portion of the first case 28, the lower portion being outside of and lateral to (at the right side of) the engine device. The urea mixing tube 39 has an intermediate portion that is bent in a second case 29 so that a mixing tube outlet 82 is inserted into the second case 29 orthogonally to a longitudinal direction of the second case 29.

An exhaust communicating tube 36 is obliquely disposed such that the exhaust communicating tube 36 is inclined toward the cylinder head 2 (toward the left) relative to a direction orthogonal (vertical) to the longitudinal direction of the second case 29. Via the exhaust communicating tube 36, an exhaust inlet tube 63 protruded from a second outer case 41 and the through-hole 56 of the first outer case 38 communicate with each other. In addition, the exhaust communicating tube 36 covers an outer peripheral surface of the intermediate portion of the urea mixing tube 39. The bent portion of the urea mixing tube 39 is located in the vicinity of through-holes 61 and 62 of the second case 29, and is covered with the exhaust communicating tube 36 and the exhaust inlet tube 63. Due to the configuration in which the bent portion of the urea mixing tube 39 is located inside the second case 29, a temperature of the tube wall of the bent portion can be increased to a high temperature. Consequently, it is possible to suppress or reduce crystallization of a urea component that collides with an inner wall surface of the exhaust communicating tube 36.

A mixer 84 is disposed in an inserted portion of the urea mixing tube 39 that is inserted into the first case 28. The mixer 84, which facilitates mixing of urea water and an exhaust gas together, is internally included in the urea mixing tube 39, and is located downstream of a portion of the urea mixing tube 39 in which exhaust introduction holes 83 are bored. In the present embodiment, the mixer 84 is located in the vicinity of the lower through-holes 55 and 56 of the first case 28. By placing the mixer 84 inside the first case 28, the mixer 84 can be under an environment of a high-temperature exhaust gas. Consequently, it is possible to improve evaporation performance achieved with the mixer 84. Not only this, it is possible to suppress or reduce formation of a crystal lump of a urea component, thereby facilitating a reaction between the urea component and an exhaust gas.

In the present embodiment, the mixer 84 is disposed inside the first case 28, and thus a distance between the mixer 84 and the mixing tube outlet 82 in the urea mixing tube 39 is long. Thanks to this, the mixing tube outlet 82 can emit the exhaust gas in which the urea component is adequately stirred and mixed. In the above configuration, the mixing tube outlet 82 of the urea mixing tube 39 inserted into the second case 29 is squeezed to be tapered, in a similar manner to the first embodiment. However, in view of the above effect, the urea mixing tube 82 may have a shape whose tube diameter is constant to its distal end. In the present embodiment, a portion of the urea mixing tube 39 close to the mixing tube inlet 81 may have a similar shape to that of the first modification of the first embodiment. Also, a portion of the urea mixing tube 39 close to the mixing tube outlet 82 may be provided with a heat exchange fin 87 in a similar manner to the second modification of the first embodiment.

With reference to FIGS. 15 and 16, the following will describe a configuration of an excavator 100 in which the diesel engine 1 according to the first or second embodiment is mounted. As illustrated in FIGS. 15 and 16, the excavator 100 includes a crawler-type traveling device 102 having a pair of left and right traveling crawlers 103 and a slewing body 104 provided above the traveling device 102. The slewing body 104 is horizontally turnable in all directions of 360° by a hydraulic motor (not illustrated) for slewing. The slewing body 104 has a front left portion in which a cabin (operation unit) 106 is mounted. The slewing body 104 has a front center portion in which a work unit 110 provided with a boom 111 and a bucket 113 each used for an excavation work is mounted. The slewing body 104 has a rear portion in which a radiator 19 and the diesel engine 1 are mounted. The slewing body 104 has a right side portion in which a fuel tank 45 and a urea water tank 71 are mounted.

In the cabin 106, an operator's seat on which an operator sits and a lever or a switch used as an operation means for operating an output of, e.g., the diesel engine 1 and/or an operation means for the work unit 110 are disposed. The boom 111, which is a component of the work unit 110, is provided with a boom cylinder 112 and a bucket cylinder 114. The boom 111 has a distal end at which a bucket 113 that is an attachment for excavation is pivotably attached such that the bucket 113 is turnable for scooping. By actuating the boom cylinder 112 or the bucket cylinder 114, the bucket 113 is actuated to perform an earthwork (a ground work such as furrowing).

The slewing body 104 has a rear left portion in which the radiator 19 is mounted. On the right side of the radiator 19, the diesel engine 1 is mounted such that a cooling fan 24 of the diesel engine 1 faces the radiator 19. The diesel engine 1 is disposed such that the side on which the exhaust manifold 6 is mounted faces the cabin 106 and the work unit 110. In addition, the top surface of the diesel engine 1 is covered with a hood 115. The first case 28 of the exhaust gas purification device 27 is disposed behind the work unit 110, and the second case 29 of the exhaust gas purification device 27 extends rearward from the connected portion between the first case 28 and the second case 29. The tail pipe 116, which is connected to the exhaust outlet of the second case 29, protrudes upward from a rear portion of the hood 115.

The fuel tank 45 and the urea water tank 71, which are disposed in the right side portion of the slewing body 104, are arranged side by side in a front-and-rear direction. The fuel tank 45 and the urea water tank 71 are respectively provided with a fuel inlet 46 and a water inlet 72 each protruding toward the right. In addition, a urea water injection pump 73 for forcibly feeding an aqueous urea solution in the urea water tank 71 is interposed between the urea water tank 71 and the first case 28. Consequently, urea water pipe arrangement for connecting the urea-water injection body 76 fixed to the first case 28 and the urea water pump 73 to each other can be made shorter. Furthermore, urea water pipe arrangement for connecting the urea water tank 71 and the urea water pump 73 to each other can also be made shorter.

With reference to the drawings (FIGS. 17 to 19), the following will describe a third embodiment in which the present invention is implemented. Note that components and parts/portions of an engine device of the present embodiment identical to those of the engine device of the second embodiment are given identical reference signs, and detailed description thereof is omitted.

Figure 17:
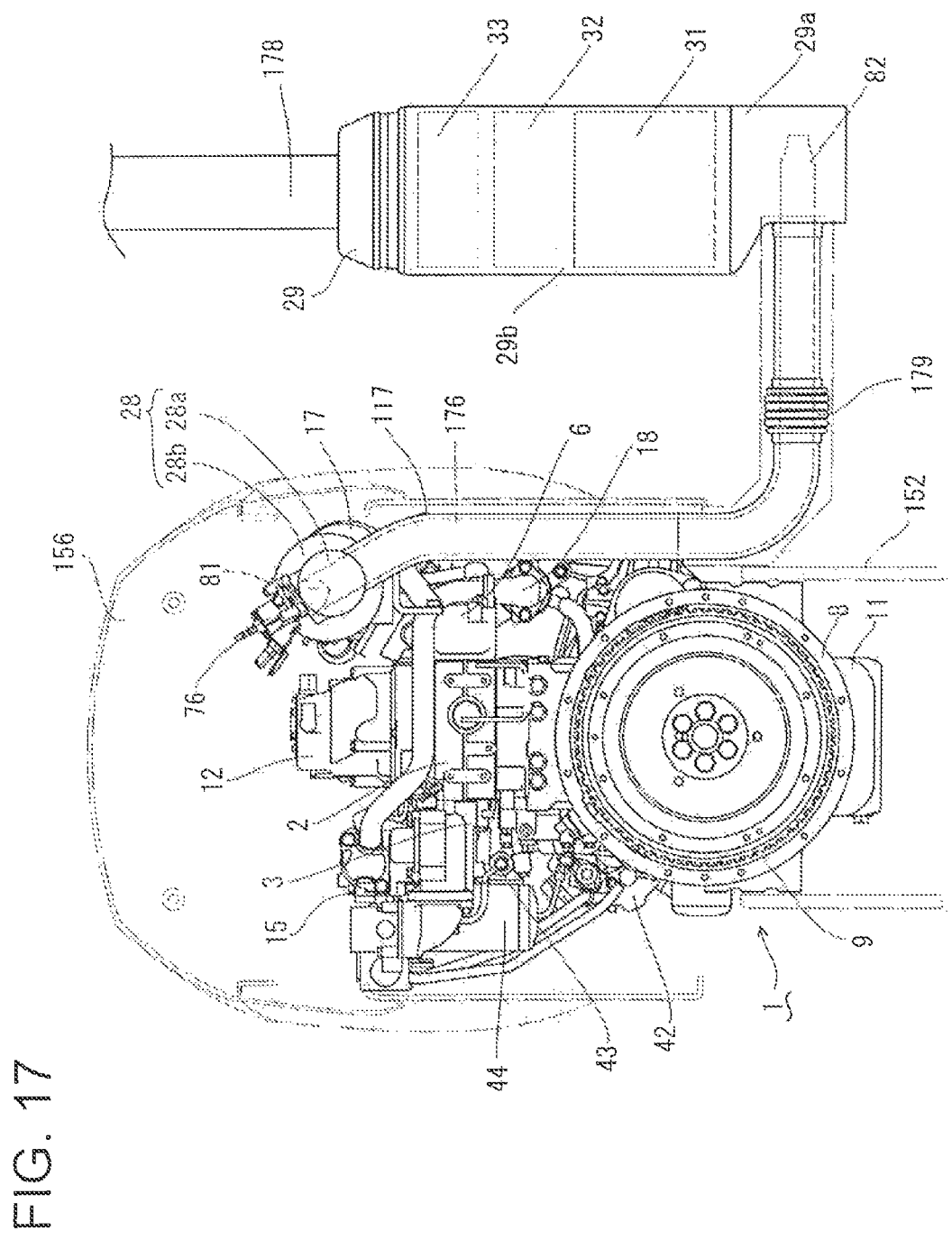
FIG. 17 illustrates a back view of a diesel engine according to a third embodiment.

As illustrated in FIG. 17, a diesel engine 1 of the present embodiment includes an exhaust gas purification device 27 including a first case 28 disposed on a top surface of the diesel engine 1 and a second case 29 disposed remotely from the diesel engine 1. An exhaust outlet of the first case 28 and an exhaust inlet of the second case 29 communicate with each other via an exhaust connecting tube 177 having an L-shape. In addition, the exhaust connecting tube 177 internally includes a urea mixing tube 176. Consequently, a connected portion between the first case 28 and the second case 29 has a double-tube structure.

Similarly to the second embodiment, the urea mixing tube 176 has a mixing tube inlet 81 inserted into an exhaust-gas downstream part 28a of the first case 28. Similarly to the second embodiment, the mixing tube inlet 81 of the urea mixing tube 176 is configured to have an end that is obliquely cut, to have exhaust introduction holes 83, and to internally include a mixer 84 (see FIG. 6).

In addition, similarly to the second embodiment, the urea mixing tube 176 has a mixing tube outlet 82 inserted into an exhaust-gas upstream part 29a of the second case 29. Similarly to the second embodiment, the mixing tube inlet 81 of the urea mixing tube 176 has a distal end that is squeezed. Note that, similarly to the first and second embodiments, the configurations of the urea mixing tubes 176 according to the first and second modifications may be applied to the urea mixing tube 176 of the present embodiment.

Figure 18:
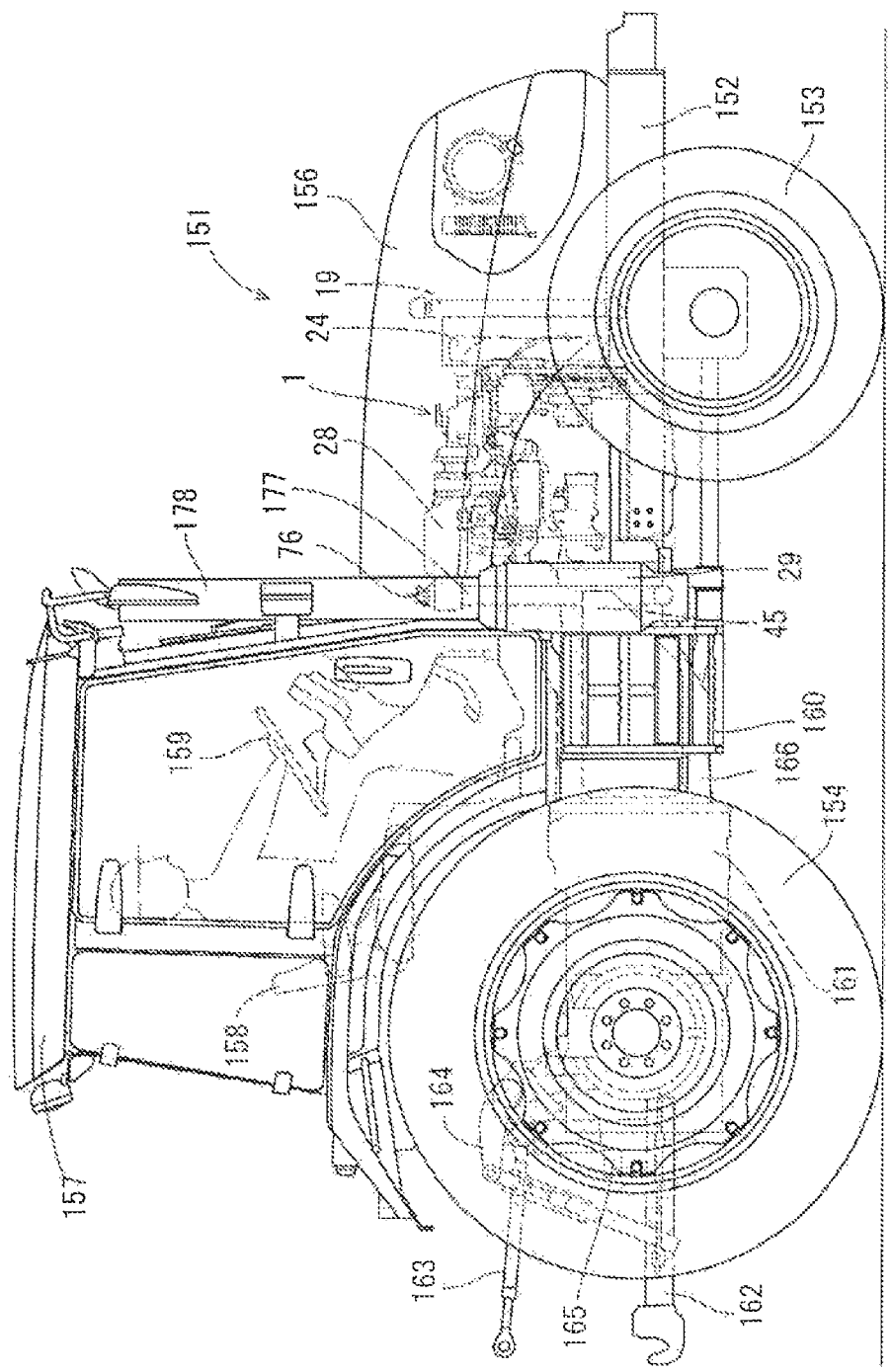
FIG. 18 illustrates a left side view of a tractor in which the diesel engine is mounted.
Figure 19:
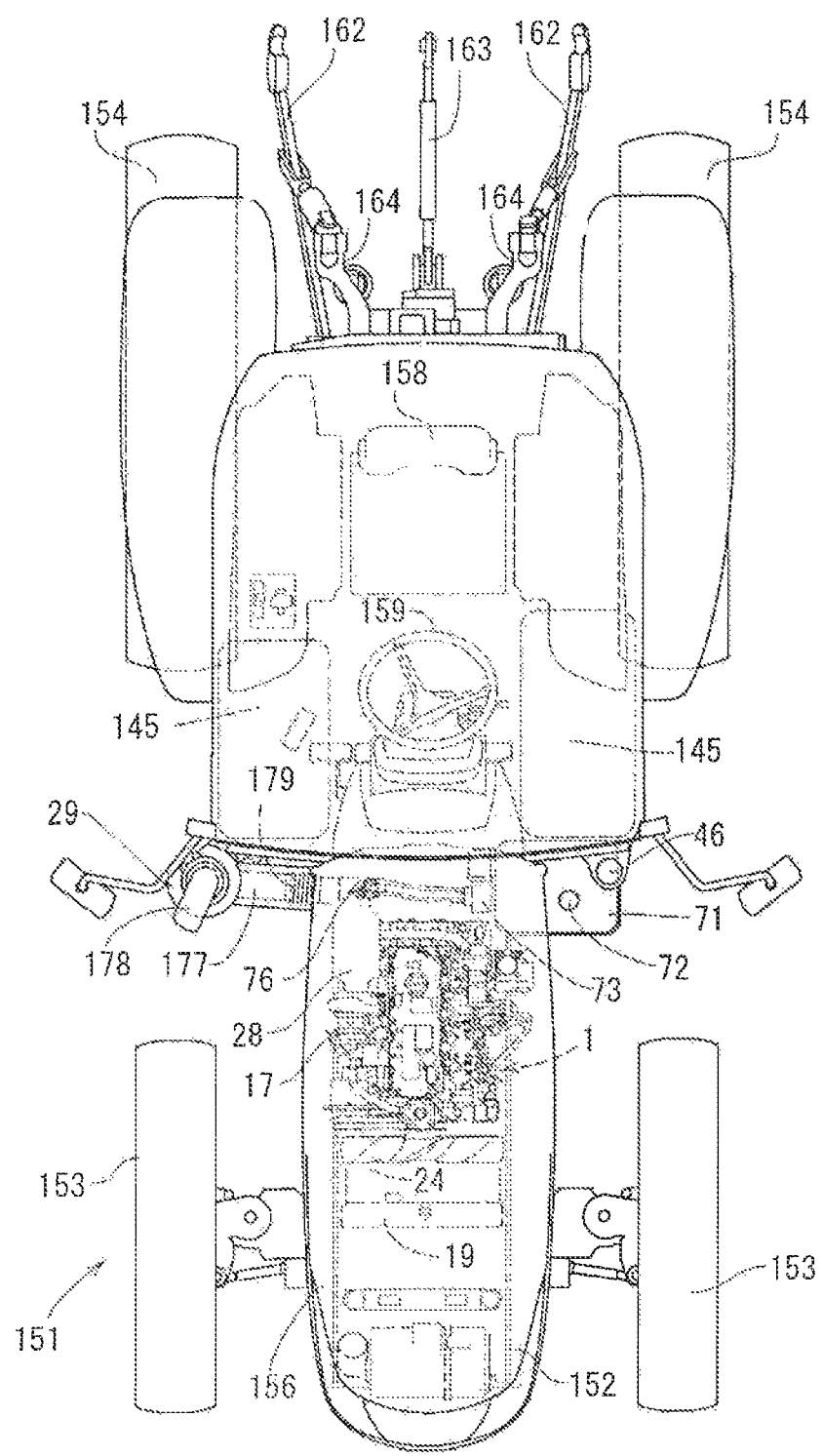
FIG. 19 illustrates a plan view of the tractor.

With reference to FIGS. 17 to 19, the following will describe a tractor 151 in which the diesel engine 1 of the third embodiment is mounted. As illustrated in FIGS. 17 to 19, a tractor 151 for an agricultural work that is a work vehicle includes: a carriage 152 supported by a pair of left and right front wheels 153 and a pair of left and right rear wheels 154; and the diesel engine 1 mounted in a front portion of the carriage 152. The diesel engine 1 is driven to drive the rear wheels 154 and the front wheels 153 to cause the tractor 151 to run forward or backward. The top surface and the left and right side surfaces of the diesel engine 1 are covered with a hood 156 that is openable.

In addition, a cabin (operation unit) 157 on which an operator is to ride is mounted on a portion of a top surface of the carriage 152, the portion being behind the hood 156. The cabin 157 includes, in its inside, an operator's seat 158 on which the operator is to sit and a steering instrument such as a steering wheel 159 that is a steering means. In addition, a pair of left and right steps 160, which can be used when the operator gets in or off the cabin 157, are provided outside of left and right sides of the cabin 157, respectively. In a space inward from the steps 160 and below a bottom of the cabin 157, a fuel tank 45 from which a fuel is supplied to the diesel engine 1 is disposed.

The carriage 152 includes a transmission case 161 for changing an output from the diesel engine 1 and transmitting the output to the rear wheels 154 (the front wheels 153). The transmission case 161 has a rear portion to which a machine such as a tilling machine (not illustrated) is connected, e.g., via a lower link 162, a top link 163, and a lift arm 164 in such a manner that the tilling machine can be raised and lowered. In addition, a power take-off (PTO) shaft 165 for driving, e.g., the tilling machine is disposed in a rear side surface of the transmission case 161. The carriage 152 of the tractor 151 includes, e.g., the diesel engine 1, the transmission case 161, and a clutch case 166 by which the diesel engine 1 and the transmission case 161 are connected to each other.

In addition, the second case 29 is attached to a right corner portion in a front surface of the cabin 157 so that the second case 29 is upright and vertically long. A tail pipe 178 is disposed upright to extend from the exhaust outlet side of the second case 29. Namely, at the right corner portion in the front surface of the cabin 157, the tail pipe 178 and the second case 29 are arranged in series in the top-and-bottom direction. The exhaust inlet tube 63 of the second case 29 is connected to the exhaust outlet of the first case 28 under the hood 156 via the exhaust connecting tube 177 having, in its intermediate portion, a bellows-tube type flexible tube 179.

The urea water tank 71 is disposed at a portion of the front surface of the cabin 157, the portion corresponding to a left side of the hood 156 and being opposite to the right side on which the tail pipe 178 is disposed. Namely, the urea water tank 71 is mounted on a portion of the carriage 152 (e.g., on a portion of a bottom frame of the cabin 157), the portion corresponding to a rear left portion of the hood 156. To a lower left portion of the front surface of the cabin 157, the fuel inlet 46 of the fuel tank 45 and the water inlet 72 of the urea water tank 71 are disposed adjacent to each other. The tail pipe 178 is disposed in a portion of the front surface of the cabin 157 on the right side, through which the operator seldom gets in and off the cabin 157. Meanwhile, the fuel inlet 46 and the water inlet 72 are disposed in a portion of the front surface of the cabin 157 on the left side, through which the operator often gets in and off the cabin 157. Note that the cabin 157 is configured such that the operator can get to and leave the operator's seat 158 through either of the left side and the right side of the cabin 157.

In addition, the urea water injection pump 73 for forcibly feeding an aqueous urea solution in the urea water tank 71 is interposed between the urea water tank 71 and the first case 28. Consequently, urea water pipe arrangement for connecting the urea-water injection body 76 fixed to the first case 28 and the urea water injection pump 73 to each other can be made shorter. Furthermore, urea water pipe arrangement for connecting the urea water tank 71 and the urea water injection pump 73 to each other can also be made shorter. Thus, efficient urea water pipe arrangement can be achieved. Consequently, it is possible to simplify a piping work and a maintenance work. Not only this, it is possible to reduce influences given by an external environment on the urea water pipe arrangement, thereby suppressing or reducing crystallization of urea water in the urea water pipe arrangement.

Note that the configurations of the parts/portions of the present invention are not limited to those in the illustrated embodiments, and can be modified and changed in various ways unless such modifications and changes depart from the scope of the present invention. For example, the configurations of the embodiments described above may be applied to an exhaust gas processing device including: a first case that is a DPF case including an oxidation catalyst and a soot filter as a first exhaust gas purification body; and a second case that is an SCR case including an SCR catalyst and an ammonia slip catalyst as a second exhaust gas purification body. In the embodiments described above, the mixer includes the blades that are fixed. Alternatively, a mixer including rotatable blades may be employed.

REFERENCE SIGNS LIST 1, diesel engine
27, exhaust gas purification device
28, first case
29, second case
30, oxidation catalyst
31, SCR filter
32, SCR catalyst
33, ammonia slip catalyst
36, exhaust communicating tube
37, first inner case
38, first outer case
39, urea mixing tube
40, second inner case
41, second outer case
76, urea-water injection body
78, urea-water injection valve
79, nozzle mounting hole
80, urea-water guide hole
81, mixing tube inlet
82, mixing tube outlet
83, exhaust introduction hole
84, mixer
85, urea collision plate
86, exhaust introduction opening
87, heat exchange fin

The invention claimed is:
1. An engine device, comprising:
an exhaust gas purification device including:
    a first case configured to remove a carbon compound from an exhaust gas; and
    a second case configured to remove a nitrogen compound from the exhaust gas,
wherein the first case and the second case are connected through a tube, and at least a portion of the tube overlaps with either the first case or the second case in a plan view, and a longitudinal direction of the first case and a longitudinal direction of the second case intersect with each other in a plan view.

2. The engine device according to claim 1, wherein,
the longitudinal direction of the first case is a direction parallel to a crankshaft of the engine in a plan view; and
the longitudinal direction of the second case is a direction orthogonal to the crankshaft of the engine in a plan view.

3. The engine device according to claim 2, wherein,
a longitudinal intermediate portion of the first case is connected to a cylinder head through a first case support bracket.

4. The engine device according to claim 3, wherein,
the second case is fixed above a flywheel housing through a second case support bracket.

* * * * *